United States Patent
Cho et al.

(10) Patent No.: US 8,622,557 B2
(45) Date of Patent: Jan. 7, 2014

(54) MICROMIRROR ARRAY LENS WITH SELF-TILTED MICROMIRRORS

(75) Inventors: Gyoung Il Cho, Seoul (KR); Jin Young Sohn, Fullerton, CA (US); Hye Young Kim, Jeonbuk (KR); Cheong Soo Seo, Seongnam (KR)

(73) Assignees: Stereo Display, Inc., Anaheim, CA (US); Angstrom Inc., Seongnam (KR)

( * ) Notice: Subject to any disclaimer, the term of this patent is extended or adjusted under 35 U.S.C. 154(b) by 1160 days.

(21) Appl. No.: 12/124,111

(22) Filed: May 20, 2008

(65) Prior Publication Data

US 2009/0290244 A1 Nov. 26, 2009

(51) Int. Cl.
*G02B 5/08* (2006.01)
*G02B 7/182* (2006.01)

(52) U.S. Cl.
USPC ........... 359/851; 359/865; 359/726; 359/558; 359/223.1

(58) Field of Classification Search
USPC ............. 359/199.1, 199.2, 224.1, 224.2, 850, 359/855, 865, 198.1, 221.1, 558, 566, 572, 359/726, 742, 846, 849, 851
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 4,853,787 A | 8/1989 | Kurth | |
| 4,944,580 A | 7/1990 | MacDonald | |
| 5,004,319 A | 4/1991 | Smither | |
| 5,172,235 A | 12/1992 | Wilm | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,661,518 A | 8/1997 | Palm | |
| 5,696,619 A | 12/1997 | Knipe | |
| 5,748,199 A | 5/1998 | Palm | |
| 5,881,034 A | 3/1999 | Mano | |
| 5,897,195 A | 4/1999 | Choate | |
| 5,986,811 A | 11/1999 | Wohlstadter | |
| 6,025,951 A * | 2/2000 | Swart et al. | 359/245 |
| 6,028,689 A | 2/2000 | Michalicek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,233,087 B1 | 5/2001 | Hawkins | |
| 6,282,213 B1 | 8/2001 | Gutin | |

(Continued)

*Primary Examiner* — Ricky D Shafer

(57) ABSTRACT

A Micromirror Array Lens with self-tilted micromirrors comprising a plurality of self-tilted micromirrors and configured to form a designed optical surface profile by self-tilted micromirrors. Each self-tilted micromirror comprises a substrate, at least one stiction plate configured to be attracted to the substrate by adhesion force, a micromirror plate having a reflective surface, coupled to the stiction plate elastically and configured to have a required motion when the stiction plate is attracted to the substrate, and at least one pivot structure disposed between the substrate and the micromirror plate and configured to provide a tilting point or area for the motion of the micromirror plate. The designed optical surface profile determines the required motion of the micromirror plate and a surface profile shape memory is built in the structure of the micro-mechanical elements of the self-tilted micromirrors so that each micromirror plate has the required motion.

25 Claims, 22 Drawing Sheets

(56) References Cited

U.S. PATENT DOCUMENTS

| | | |
|---|---|---|
| 6,304,263 B1 | 10/2001 | Chlabrera |
| 6,315,423 B1 | 11/2001 | Yu |
| 6,329,737 B1 | 12/2001 | Jerman |
| 6,329,963 B1 | 12/2001 | Chlabrera |
| 6,421,081 B1 | 7/2002 | Markus |
| 6,438,272 B1 | 8/2002 | Huang |
| 6,498,673 B1 | 12/2002 | Frigo |
| 6,507,366 B1 | 1/2003 | Lee |
| 6,526,198 B1 * | 2/2003 | Wu et al. .................. 385/18 |
| 6,549,730 B1 | 4/2003 | Hamada |
| 6,600,591 B2 * | 7/2003 | Anderson et al. ............. 359/291 |
| 6,611,343 B1 | 8/2003 | Frankowski |
| 6,614,581 B2 * | 9/2003 | Anderson ................ 359/295 |
| 6,618,209 B2 | 9/2003 | Nishioka |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,781,731 B2 | 8/2004 | Choi |
| 6,781,732 B2 | 8/2004 | Cho |
| 6,784,771 B1 | 8/2004 | Fan |
| 6,791,235 B2 * | 9/2004 | Miller et al. ............... 310/311 |
| 6,801,260 B1 | 10/2004 | Veksland |
| 6,804,429 B2 | 10/2004 | Yu |
| 6,833,938 B2 | 12/2004 | Nishioka |
| 6,836,459 B2 | 12/2004 | Komoto |
| 6,870,660 B2 | 3/2005 | DiCarlo |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,909,453 B2 | 6/2005 | Mochizuki |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,944,103 B2 | 9/2005 | Hong |
| 6,956,687 B2 | 10/2005 | Moon |
| 6,958,777 B1 | 10/2005 | Pine |
| 6,970,284 B1 | 11/2005 | Kim |
| 6,971,118 B2 | 11/2005 | Akhavan |
| 6,985,299 B2 | 1/2006 | Bakln |
| 6,995,897 B2 | 2/2006 | Mushlka |
| 6,995,909 B1 | 2/2006 | Hayashi |
| 6,999,226 B2 | 2/2006 | Kim |
| 7,009,561 B2 | 3/2006 | Menache |
| 7,019,376 B2 | 3/2006 | Patel |
| 7,023,466 B2 | 4/2006 | Favalora |
| 7,025,461 B2 | 4/2006 | Veligdan |
| 7,027,207 B2 | 4/2006 | Hulbers |
| 7,031,046 B2 | 4/2006 | Kim |
| 7,046,447 B2 | 5/2006 | Raber |
| 7,057,826 B2 | 6/2006 | Cho |
| 7,068,415 B2 | 6/2006 | Mushlka |
| 7,068,416 B2 | 6/2006 | Gim |
| 7,077,523 B2 | 7/2006 | Seo |
| 7,079,325 B2 | 7/2006 | Konno |
| 7,088,493 B2 | 8/2006 | Alain |
| 7,091,057 B2 | 8/2006 | Gan |
| 7,127,136 B2 | 10/2006 | Hall |
| 7,161,729 B2 | 1/2007 | Kim |
| 7,164,465 B2 | 1/2007 | Klosner |
| 7,173,653 B2 | 2/2007 | Gim |
| 7,184,192 B2 | 2/2007 | Sandstrom |
| 7,195,163 B2 | 3/2007 | Yoo |
| 7,209,286 B2 | 4/2007 | Mann |
| 7,212,330 B2 | 5/2007 | Seo |
| 7,215,882 B2 | 5/2007 | Cho |
| 7,239,438 B2 * | 7/2007 | Cho et al. .................. 359/290 |
| 7,245,325 B2 | 7/2007 | Yamaguchi |
| 7,245,363 B2 | 7/2007 | Mushike |
| 7,261,417 B2 | 8/2007 | Cho |
| 7,267,447 B2 | 9/2007 | Kim |
| 7,274,517 B2 | 9/2007 | Cho |
| 7,306,344 B2 | 12/2007 | Abu-Ageel |
| 7,315,503 B2 | 1/2008 | Cho |
| 7,330,297 B2 * | 2/2008 | Noh et al. .................. 359/291 |
| 7,333,260 B2 | 2/2008 | Cho |
| 7,339,746 B2 | 3/2008 | Kim |
| 7,354,167 B2 | 4/2008 | Cho |
| 7,355,627 B2 | 4/2008 | Yamazaki |
| 7,370,412 B2 | 5/2008 | Hiraoka |
| 7,382,516 B2 * | 6/2008 | Seo et al. .................. 359/291 |
| 7,400,437 B2 * | 7/2008 | Cho et al. .................. 359/291 |
| 7,474,454 B2 * | 1/2009 | Seo et al. .................. 359/290 |
| 7,535,618 B2 * | 5/2009 | Kim et al. .................. 359/290 |
| 2003/0174234 A1 | 9/2003 | Kondo |
| 2004/0021802 A1 | 2/2004 | Yoshino |
| 2004/0184146 A1 | 9/2004 | Uehara |
| 2004/0207768 A1 | 10/2004 | Liu |
| 2005/0206773 A1 | 9/2005 | Kim |
| 2005/0207486 A1 | 9/2005 | Lee |
| 2005/0212856 A1 | 9/2005 | Temple |
| 2005/0259158 A1 | 11/2005 | Jacob |
| 2005/0280883 A1 * | 12/2005 | Seo et al. .................. 359/29 |
| 2006/0007301 A1 | 1/2006 | Cho |
| 2006/0120706 A1 | 6/2006 | Cho |
| 2006/0146140 A1 | 7/2006 | Kennedy |
| 2006/0209439 A1 | 9/2006 | Cho |
| 2006/0256332 A1 | 11/2006 | Sandstrom |
| 2007/0263113 A1 | 11/2007 | Baek |

\* cited by examiner

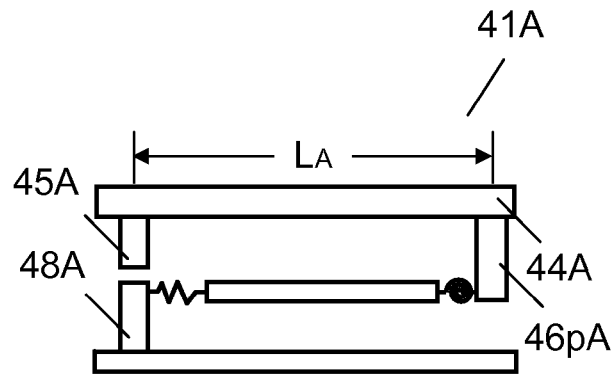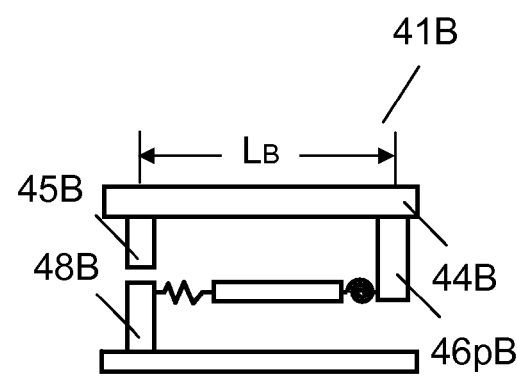
FIG. 4A　　　　　　　　　　　　FIG. 4B
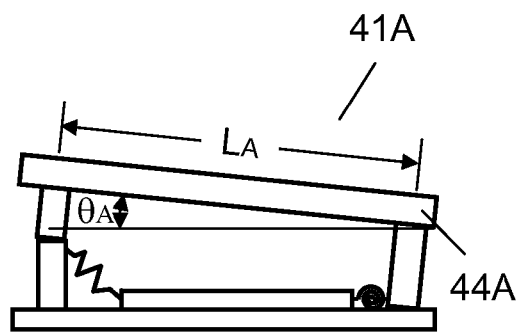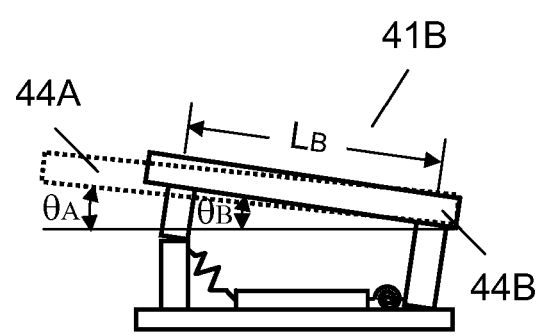
FIG. 4C　　　　　　　　　　　　FIG. 4D

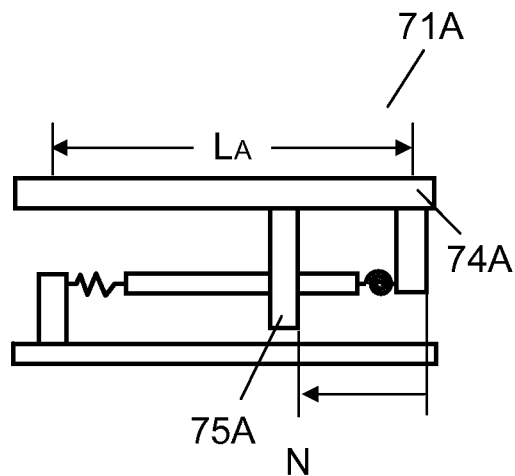
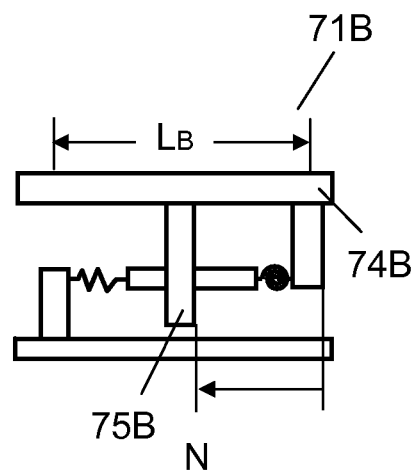
FIG. 7A
FIG. 7B
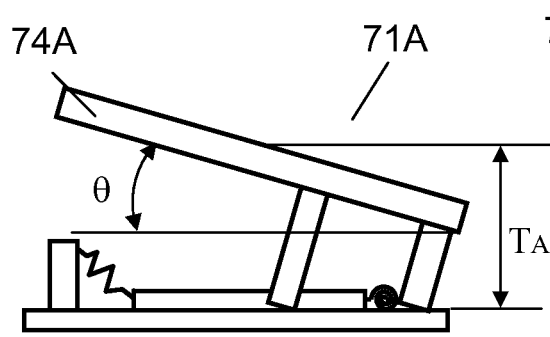
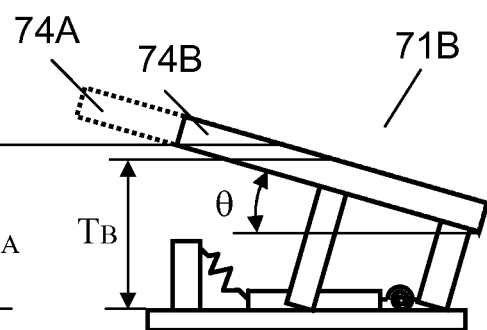
FIG. 7C
FIG. 7D

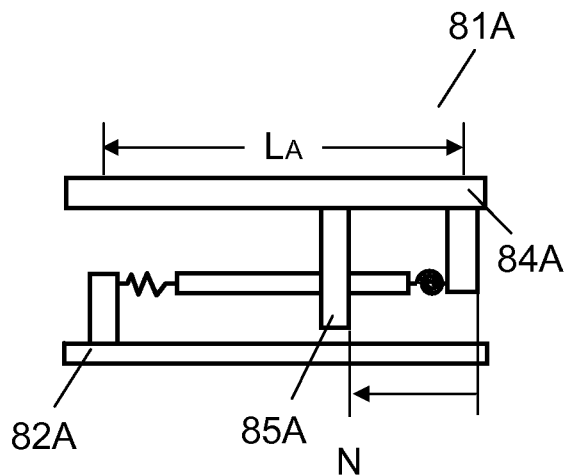
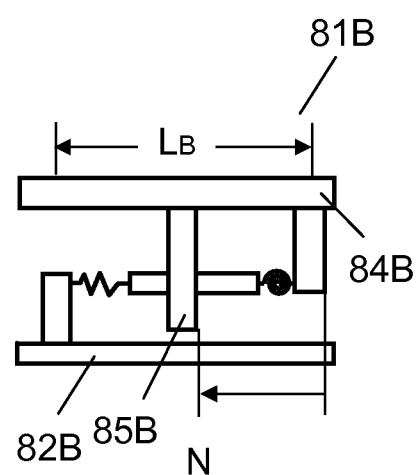
FIG. 8A
FIG. 8B
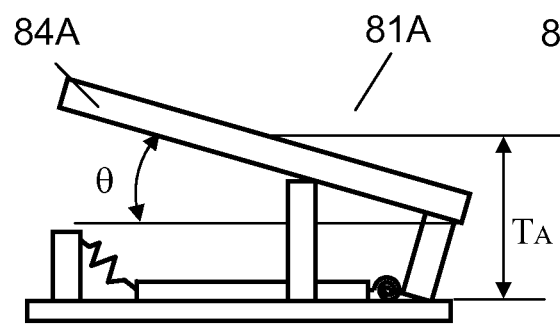
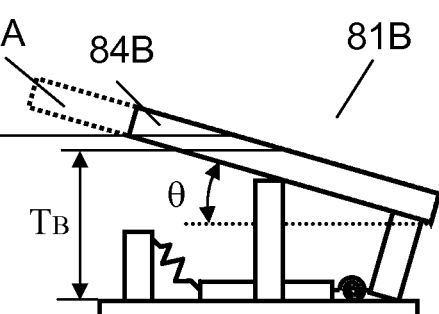
FIG. 8C
FIG. 8D

MICROMIRROR ARRAY LENS WITH SELF-TILTED MICROMIRRORS

FIELD OF INVENTION

The present invention relates to lens fabrication and designing, more specifically, Micromirror Array Lens (Micromirror Array Lens) fabrication and designing.

BACKGROUND OF THE INVENTION

Optical systems are part of everyday life. The optical systems are found in virtually everywhere including in small portable electronics (e.g. digital camera, camcorder, camera phone, webcam), office supplies (e.g. printer, scanner, fax machine), surveillance systems, toys, quality control systems, laboratory and observatory equipments (e.g. telescope, microscope), medical equipments (e.g. endoscope), etc. The conventional lenses used in the optical systems continually face challenge of balancing image quality and production cost. The spherical lenses are widely used since they can be relatively easily fabricated with low cost. The optical systems using them, however, tend to suffer from the aberration problem and in turn produce low quality images. A sort of aspherical lenses configured to remove or reduce aberration can be used for improving image quality. However, the fabricating process of aspherical lenses is time consuming, complicated, and expensive, which hinder the wide use of the aspherical lenses.

Another challenge in the conventional lenses is to make them large. Conventional Fresnel type lenses are a good solution to make large lenses without handling large and heavy materials. However, the image quality of the Fresnel lens is not as good as that of the conventional lens.

To overcome the difficulties in fabricating conventional lenses, lenses using new fabrication methods have been introduced. Gradient index lenses are one example. Instead of using geometrical variation, the variation of refractive index is used to give the same effect in making a lens. Using the refractive index of material and geometrical variation together, the aberration of the optical system can be reduced. Although the gradient index lens gives the significant reduction of the aberration, it is still expensive and difficult to fabricate.

With the rapid growth of the MEMS technology, wide variety MEMS applications have been developed. One of well known application of the MEMS technology is micromirror devices using a plurality of micromirrors; for example, Digital Micromirror Device (DMD) used in the DLP (Digital Light Processing) projection devices. The DMD is an array of several hundred thousand micromirrors, wherein each individual micromirror has the same structure with one another and works as an on-off optical switch. With the success of the DMD technology, many efforts have been made to improve the micromirror devices to provide more advanced features such as multiple step motions, multiple degree of freedom motion, and simple actuation mechanism.

These advance features can be advantageously used to overcome the difficulties in fabricating conventional lenses. One exemplary micromirror device using these features is a Micromirror Array Lens reproducing conventional lenses. The Micromirror Array Lens comprises a plurality of micromirrors configured to have multiple step motions in multiple degrees of freedom and forms at least one optical surface profile by controlling the motions of the micromirrors. Each optical surface profile of the Micromirror Array Lens reproduces a conventional lens. The Micromirror Array Lens can be used as a variable focal length lens having multiple optical surface profiles. The Micromirror Array Lens with variable focal length lens and the properties of the Micromirror Array Lens can be found in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007 to Kim, U.S. Pat. No. 6,999,226 issued Feb. 14, 2006 to Kim, U.S. Pat. No. 7,095,548 issued Aug. 22, 2006 to Cho, U.S. Pat. No. 7,239,438 issued Jul. 3, 2007 to Cho, U.S. Pat. No. 7,267,447 issued Sep. 11, 2007 to Kim, U.S. Pat. No. 7,274,517 issued Sep. 25, 2007 to Cho, U.S. patent application Ser. No. 11/426,565 filed Jun. 26, 2006, U.S. patent application Ser. No. 11/743,664 filed May 2, 2007, and U.S. patent application Ser. No. 11/933,105 filed Oct. 31, 2007, all of which are incorporated herein by references. Typically, the micromirrors in the Micromirror Array Lens have the same structures with one another, wherein the structure is configured to provide a micromirror with multiple step motions. This structure is favorable when the Micromirror Array Lens reproduces multiple conventional lenses or a variable focal length lens.

Instead of producing multiple optical surface profiles, the Micromirror Array Lens can be configured to reproduce a single conventional lens or a fixed focal length lens as well. Each micromirror has a required motion to form a given optical surface profile but the required motion for one micromirror can be different from the required motions of others. When each micromirror is made to have the same structure, the structure still has to be configured to provide each micromirror with multiple motions just like the case of reproducing a variable focal length lens because each micromirror has a different required position. This can make the Micromirror Array Lens have unnecessarily complicated structure and require a control circuitry to control the motions of the micromirrors. In order to simplify the fabrication process and operation, the structure of the micromirror can be customized to have only the required motion.

The fixed focal length Micromirror Array Lens has a lot of advantages and can solve many problems in fabricating the conventional lenses. First, the fabrication process of the Micromirror Array Lens is size independent. Since the Micromirror Array Lens uses standard semiconductor fabrication processes, making process of the Micromirror Array Lens is only dependent on the substrate wafer size. If the size of the lens is less than that of substrate wafer, then fabrication process is the same. Second, different kinds of lenses can be fabricated together. While fabricating the conventional lenses, the curvature of the lens determines the fabrication capability. Thus, only one kind of lens can be fabricated together. While fabricating the Micromirror Array Lenses, many different kinds of the Micromirror Array Lenses can be fabricated together. Third, since the Micromirror Array Lens is an adaptive optical element, the aberration of the optical system can be corrected by introducing the Micromirror Array Lens. Each micromirror can be designed to correct the aberration problem of the optical system. Fourth, mass productivity is a major advantage of the Micromirror Array Lens. Since Micromirror Array Lens is fabricated by using standard semiconductor procedures, the mass production of lenses can be easily achieved. Also, since the Micromirror Array Lens is arranged in a flat surface, the Micromirror Array Lens reduces the size of the optical system and also critically reduces the problems of mounting optics. And last, the fixed focal length Micromirror Array Lens has a great advantage over variable focal length Micromirror Array Lens. Since the structure of the micromirror can be simplified, the fabrication becomes extremely simple. Also the production cost is so low that the fixed focal length Micromirror Array Lens can substitute the conventional lens in the optical systems.

The present invention provides a new simple lens surface forming and fabrication process. By introducing the Micromirror Array Lens with a surface profile shape memory, simple Micromirror Array Lens can be fabricated without loosing the great advantages of the Micromirror Array Lens.

SUMMARY OF THE INVENTION

An object of the present invention is to provide a new fabrication and designing method for Micromirror Array Lenses overcoming obstacles of the conventional lenses. Fabricating a lens is very difficult depending on its size, surface profile, material properties (index of refraction) and shape. The present invention of the Micromirror Array Lens with self-tilted micromirrors provides a new method of lens fabrication virtually independent of its size, surface profile, and shape. Also, since the Micromirror Array Lens is a reflective type lens, the material properties are not a barrier for fabricating a lens any more.

The general principle, structure and methods for making the micromirror array devices and Micromirror Array Lens are disclosed in U.S. patent application Ser. No. 10/872,241 filed Jun. 18, 2004, U.S. Pat. No. 7,330,297 issued Feb. 12, 2008 to Noh, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. Pat. No. 7,365,899 issued Apr. 29, 2008 to Gim, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, U.S. patent application Ser. No. 11/742,510 filed Apr. 30, 2007, and U.S. patent application Ser. No. 11/762,683 filed Jun. 13, 2007, all of which are incorporated herein by references.

By introducing a surface profile shape memory, a Micromirror Array Lens can form a designed optical surface profile to function as a lens. The surface profile shape memory remembers a designed optical surface profile for the Micromirror Array Lens and the designed optical surface profile is formed after fabricating the Micromirror Array Lens. The Micromirror Array Lens with self-tilted micromirrors is fabricated with a surface profile shape memory. After fabrication of the Micromirror Array Lens, the Micromirror Array Lens forms a lens with a fixed focal length. The forming process of the designed optical surface profile after fabrication is a great advantage of the surface profile shape memory. The forming process of the Micromirror Array Lens is accomplished either while the micro-mechanical elements are released by removing sacrificial layers or while the initial operation of the Micromirror Array Lens. Once the designed optical surface profile is formed, the property of the Micromirror Array Lens is fixed and the Micromirror Array Lens performs its function of a lens.

Another objective of the present invention is to provide a low cost lens to replace the current commercial lens optics. With mass productivity of semiconductor technology, the Micromirror Array Lens with self-tilted micromirrors can be manufactured with low cost. Thanks to the easy variation of the Micromirror Array Lens, the Micromirror Array Lens having a designed optical surface profile can be easily designed and fabricated by the mass production process.

A great advantage of the present invention is that the Micromirror Array Lenses having different designed optical surface profiles can be made with the same fabrication process including all processing conditions since the Micromirror Array Lens forms its own designed optical surface profile after fabrication, Even in the same wafer, many different Micromirror Array Lenses can be fabricated altogether. All the Micromirror Array Lenses have their own surface profile shape memories and form corresponding designed optical surface profiles and finally function as lenses.

A Micromirror Array Lens with self-tilted micromirrors comprises a plurality of self-tilted micromirrors and configured to form a designed optical surface profile by self-tilted micromirrors. The self-tilted micromirror of the present invention comprises a substrate, at least one stiction plate configured to be attracted to the substrate by adhesion force, a micromirror plate having a reflective surface, coupled to the stiction plate elastically and configured to have a required motion when the stiction plate is attracted to the substrate, and at least one pivot structure disposed between the substrate and the micromirror plate and configured to provide a tilting point or area for the motion of the micromirror plate. The designed optical surface profile determines the required motion of the micromirror plate and a surface profile shape memory is built in the structure of the micro-mechanical elements of the self-tilted micromirrors so that each micromirror plate has the required motion.

The stiction plate is disposed between the substrate and the micromirror plate and connected to the micromirror plate elastically by at least one micromirror plate spring structure. The micromirror plate spring structure can be a torsional spring structure or a flexible beam allowing stiction plate to have a relative rotational motion with respect to the micromirror plate. When the stiction plate is attracted to the substrate, the micromirror plate spring structure is configured to be deformed until the stiction plate contacts the substrate. The micromirror plate spring structure is configured to reduce or minimize the bending of the stiction plate and/or the micromirror plate. The self-tilted micromirror can further comprise at least one micromirror plate post configured to provide a space between the micromirror plate and the stiction plate and connecting the micromirror plate and the micromirror plate spring structure.

The pivot structure provides a space between the substrate and the micromirror plate to allow the motion of the micromirror plate and a portion of the pivot structure becomes a tilting point or area for the motion of the micromirror plate when the stiction plate is attracted to the substrate. The pivot structure can be disposed on the substrate and configured to contact the micromirror plate when the stiction plate is attracted to the substrate. Also, the pivot structure can be disposed on the micromirror plate and configured to contact the substrate when the stiction plate is attracted to the substrate.

The stiction plate is configured to be attracted to the substrate by adhesion force; for example, adhesion surface forces. As the size of the self-tilted micromirror decreases to micro-scale, the surface-to-volume ratio increases. Therefore, the effects of surface forces such as capillary force, van der Waals force, atomic bonding force, and electrostatic force by residual charge become significant. In conventional MEMS devices, these adhesion surface forces pose non-trivial problems such as unwanted stiction or collapse of the micro-mechanical elements. The present invention utilizes these adhesion surface forces advantageously to make the self-tilted micromirror have a required motion. In order to increase the amount of the adhesion surface forces, the stiction plate is configured to have a large surface area. Also, a passivation layer can be deposited on the substrate in order to increase the adhesion force.

One of the adhesion surface forces is the capillary force. The capillary action occurred due to liquid used in the releasing process of the micro-mechanical elements. The capillary action is caused by adhesive intermolecular force between different substances. The liquid left in the releasing process of the micro-mechanical elements adheres to the substrate and stiction plate and draws the stiction plate toward to the substrate. During the drying process, the amount of the liquid between the substrate and the stiction plate decreases and so further does the distance between substrate and the stiction plate. The capillary action can initiate the attraction of the stiction plate.

In addition to capillary action, stiction force including other adhesion surface forces such as van der Waals force, atomic bonding force, and electrostatic force by residual charge are generated. Although the liquid is eventually dried up, these stiction forces keep attracting the stiction plate toward the substrate and eventually make the surfaces of the substrate and the stiction plate contact. The substrate and stiction plate remain in contact if the stiction force is strong enough to overcome restoring force of the deformed micro-mechanical elements of the self-tilted micromirror including the micromirror plate spring structure. The micromirror plate spring structure is configured to be flexible enough such that the stiction force overcomes restoring force caused by the deformation of the micromirror plate spring structure. Then, the micromirror plate can have a fixed position without applying any external force.

The stiction plate is attracted to the substrate in the releasing process of the micro-mechanical elements. The stiction plate is attracted to the substrate in the initial operation of the self-tilted micromirror. The linear and angular position of the micromirror plate remains fixed by the adhesion force after the motion of the micromirror plate.

In order to connect the substrate and the other micro-mechanical elements, the self-tilted micromirror can further comprise at least one support structure. The support structure is disposed on the substrate and connected to the stiction plate elastically. The self-tilted micromirror can further comprise at least one substrate spring structure connecting the stiction plate and the support structure. The substrate spring structure is configured to be stiff enough to hold the micro-mechanical elements in place at the perturbation and flexible enough such that the stiction force can overcome restoring force caused by the deformation of the micromirror plate spring structure and the substrate spring structure to enable the stiction plate to contact the substrate. The pivot structure can be disposed on the micromirror plate and configured to contact the support structure when the stiction plate is attracted to the substrate. Also, the pivot structure can be the support structure configured to contact the micromirror plate when the stiction plate is attracted to the substrate.

To avoid unwanted stiction problems between the micromirror plate and other micro-mechanical elements, the self-tilted micromirror can further comprise at least one dimple structure disposed between the stiction plate and the micromirror plate and configured to provide a space between the stiction plate and the micromirror plate. The dimple structure prevents unnecessary contact between the micromirror plate and other micro-mechanical elements of the self-tilted micromirror.

The linear and angular position of the micromirror plate after the releasing process can be predetermined by the design process of the geometry of the self-tilted micromirror. In some case, the motion of the micromirror plate is determined by the contact points between the micromirror plate and the pivot structure and the contact points between the substrate and stiction plate. In some other cases, the motion of the micromirror plate is determined by the contact points between the pivot structure and the substrate and the contact points between the substrate and stiction plate. To change these contact points, the geometry of the micro-mechanical elements of the self-tilted micromirror can be varied.

In the design process of the Micromirror Array Lens, the required optical surface profile of the Micromirror Array Lens is designed. This designed optical surface profile determines the required motion of each micromirror plate. The surface profile shape memory is built in the structure of micro-mechanical elements of the self-tilted micromirrors in the Micromirror Array Lens so that the micromirror plates can have the required motions to form a designed optical surface profile. The required motions of the micromirror plates determine the sizes of the micromirror plates. Also, the required motions of the micromirror plates determine the sizes and/or positions of the pivot structures.

The designed optical surface profile is formed by the adhesion force between the stiction plates and the substrate in the Micromirror Array Lens while releasing the micro-mechanical structures of the Micromirror Array Lens. Also, the designed optical surface profile can be formed by the initial operation of the Micromirror Array Lens. The Micromirror Array Lens has the fixed designed optical surface profile by the stiction force between micro-mechanical elements and is used as a fixed focal length lens.

Further, an array of self-tilted micromirrors can form a plurality of Micromirror Array Lenses, wherein the self-tilted micromirrors are divided into parts and each part forms a different Micromirror Array Lens having designed a optical surface profile.

Conventional reflective optical elements should have non-flat surfaces to have an optical power. On the contrary, the designed optical surface profile of the Micromirror Array Lens is formed and arranged in a flat surface. The Micromirror Array Lens can have an optical power of a non-flat surface optical element even if it is formed in the flat surface. Each self-tilted micromirror in the Micromirror Array Lens has its own translational (linear) and rotational (angular) motion to have an optical power of the non-flat surface optical element. Alternatively, the Micromirror Array Lens can be formed and arranged in a surface with a curvature.

To form a good lens, two conditions must be satisfied. One is the convergence condition that every light should be converged into a focal point. And the other is the phase matching condition that the phase of the converged light should be the same. In a conventional lens, the phase matching condition is that all the light passing through a lens should have the same optical path length to the focal point. But Micromirror Array Lens uses the periodicity of the light to satisfy the phase matching condition. Since the same phase condition occurs periodically, the phase matching condition can be satisfied even though the optical path length is different. Each micromirror plate in the Micromirror Array Lens can be configured to satisfy the phase matching condition and the convergence condition.

Since the Micromirror Array Lens with the designed optical surface profile functions as a lens, the designed optical surface profile is prepared to satisfy the convergence condition to form a lens. Also, the designed optical surface profile is prepared to satisfy the phase matching condition to form a lens. The convergence and phase matching conditions are satisfied by the structure of the micro-mechanical elements in the Micromirror Array Lens.

Since the Micromirror Array Lens is a kind of adaptive optics, the Micromirror Array Lens can correct aberration of an optical system. The designed optical surface profile of the Micromirror Array Lens is prepared to correct aberration of the optical system.

The optical focusing power of the Micromirror Array Lens is determined by the properties of the designed optical surface profile. The Micromirror Array Lens can reproduce conic surfaces, aspherical surfaces, and anamorphic aspherical surfaces. Also, the Micromirror Array Lens reproduces a free surface. Further, the Micromirror Array Lens can reproduce discrete surfaces. The Micromirror Array Lens reproduces a Fresnel type reflective lens. Also, the Micromirror Array Lens reproduces a diffractive optical element.

Each micromirror plate in the Micromirror Array Lens can have its own translational and rotational motions to form a lens. The required rotational motion of the micromirror plate is determined to satisfy the convergence condition of the lens and the required translational motion is determined to satisfy the phase matching condition of the lens.

The Micromirror Array Lens with self-tilted micromirrors of the present invention has many advantages including: (1) the lens with surface profile shape memory provides an easy fabrication of lens system; (2) fabrication of the lens is size-independent; (3) fabrication of the lens is surface profile or shape independent; (4) fabrication of the lens is material independent; (5) the surface profile of the lens is formed after fabrication; (6) the lens can be manufactured with a low cost; (7) different shape or size lenses can be fabricated together; (8) the lens is an adaptive optics; (9) aberration of the system can be corrected; and (10) the lens has a simple structure.

Although the present invention is briefly summarized, full understanding of the invention can be obtained by the following drawings, detailed description, and appended claims.

DESCRIPTION OF THE FIGURES

These and other features, aspects and advantages of the present invention will become better understood with reference to the accompanying drawings, wherein:

FIGS. 4A-4D are schematic diagrams showing the effects of variation in the effective size of the micromirror plate;

FIGS. 7A-7D are schematic diagrams showing self-tilted micromirrors providing the micromirror plates with independent translational motion and rotational motion;

FIGS. 8A-8D are schematic diagrams showing self-tilted micromirrors providing the micromirror plates with independent translational motion and rotational motion;

DETAILED DESCRIPTION OF THE INVENTION

The present invention will now be described in detail with reference to embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order not to unnecessarily obscure the present invention.

Figure 1A:
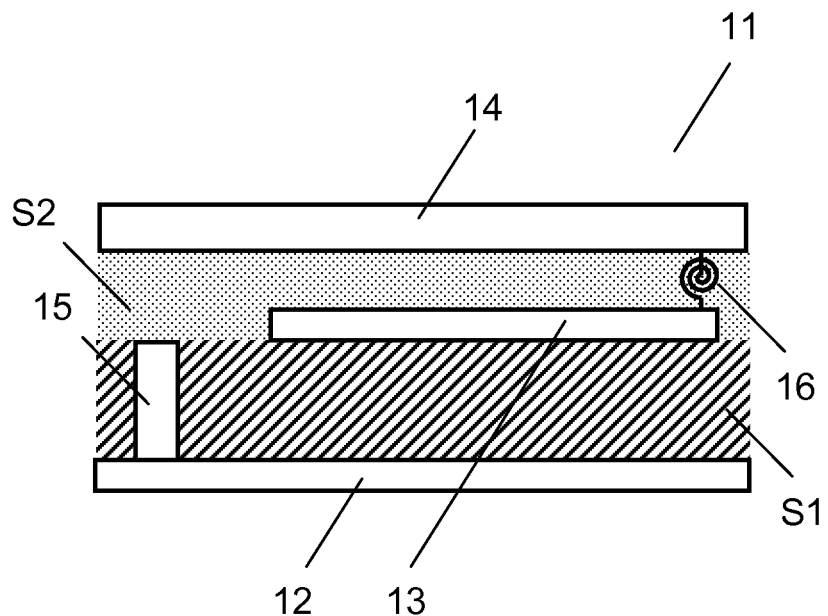
FIGS. 1A and 1B are schematic diagrams of one embodiment of a self-tiled micromirror of the present invention illustrating essential components and brief fabrication process.
Figure 1B:
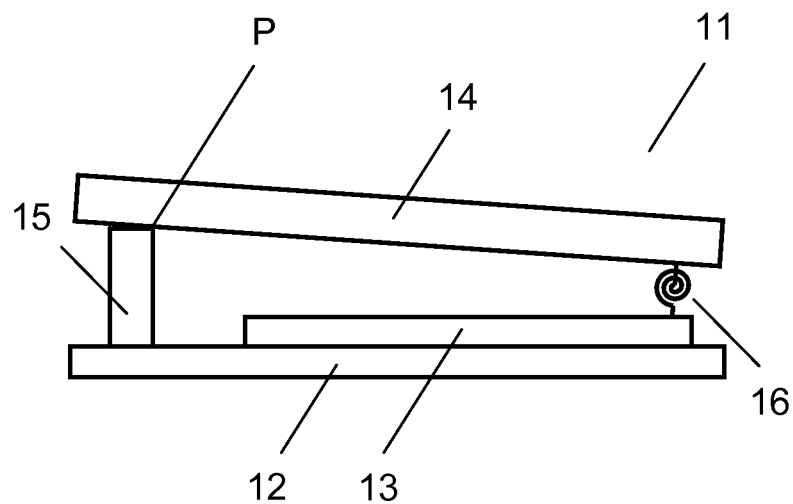

FIGS. 1-16 illustrate the structures and fabrication processes of various self-tilted micromirrors of the present invention. FIGS. 1A and 1B are schematic diagrams of one embodiment of a self-tiled micromirror of the present invention illustrating the essential components and brief fabrication process of the self-tilted micromirror of the present invention. A self-tilted micromirror 11 of the present invention comprises a plurality of micro-mechanical elements including a substrate 12, at least one stiction plate 13 configured to be attracted to the substrate 12 by adhesion force, a micromirror plate 14 coupled to the stiction plate 13 elastically and configured to have at least one motion when the stiction plate 13 is attracted to the substrate 12, and at least one pivot structure 15 disposed between the substrate 12 and the micromirror plate 14 and configured to provide a tilting point or area P for the motion of the micromirror plate 14, wherein the motion of the micromirror plate 14 is determined by the geometry of the micro-mechanical elements of the self-tilted micromirror 11. FIGS. 1A and 1B show the self-tilted micromirror 11 before and after the motion of the micromirror plate 14, respectively.

The stiction plate 13 is disposed between the substrate 12 and the micromirror plate 14 and connected to the micromirror plate 14 elastically by at least one micromirror plate spring structure 16. The micromirror plate spring structure 16 can be a torsional spring structure or a flexible beam allowing stiction plate 13 to have a relative rotational motion with respect to the micromirror plate 14. When the stiction plate 13 is attracted to the substrate 12, the micromirror plate spring structure 16 is configured to be deformed until the stiction plate 13 contacts the substrate 12. The micromirror plate spring structure 16 is configured to reduce or minimize the bending of the stiction plate 13 and/or the micromirror plate 14.

The pivot structure 15 provides a space between the substrate 12 and micromirror plate 14 to allow the motion of the micromirror plate 14 and a portion of the pivot structure 15 becomes a tilting point or area P for the motion of the micromirror plate 14 when the stiction plate 13 is attracted to the substrate 12 as shown in FIG. 1B.

The stiction plate 13 is configured to be attracted to the substrate 12 by adhesion force; for example, adhesion surface forces. As the size of the self-tilted micromirror 11 decreases to micro-scale, the surface-to-volume ratio increases. Therefore, the effects of surface forces such as capillary force, van der Waals force, atomic bonding force, and electrostatic force by residual charge become significant. In conventional MEMS devices, these adhesion surface forces pose non-trivial problems such as unwanted stiction or collapse of the micro-mechanical elements. The present invention utilizes these adhesion surface forces advantageously to make the self-tilted micromirror 11 have a required motion. In order to increase the amount of the adhesion surface forces, the stiction plate 13 is configured to have a large surface area. Also, a passivation layer can be deposited on the substrate 12 in order to increase the adhesion force.

One of the adhesion surface forces is the capillary force. The capillary action occurred due to liquid used in the releasing process of the micro-mechanical elements. The capillary action is caused by adhesive intermolecular force between different substances. The liquid left in the releasing process of the micro-mechanical elements adheres to the substrate 12 and stiction plate 13 and draws the stiction plate 13 toward to the substrate 12. During the drying process, the amount of the liquid between the substrate 12 and the stiction plate 13 decreases and so further does the distance between substrate 12 and the stiction plate 13. The capillary action can initiate the attraction of the stiction plate 13.

In addition to capillary action, stiction force including other adhesion surface forces such as van der Waals force, atomic bonding force, and electrostatic force by residual charge are generated. Although the liquid is eventually dried up, these stiction forces keep attracting the stiction plate 13 toward the substrate 12 and eventually make the surfaces of the substrate 12 and the stiction plate 13 contact. The substrate 12 and stiction plate 13 remain in contact if the stiction force is strong enough to overcome restoring force of the deformed micro-mechanical elements of the self-tilted micromirror 11 including the micromirror plate spring structure 16. The micromirror plate spring structure 16 is configured to be flexible enough such that the stiction force overcomes restoring force caused by the deformation of the micromirror plate spring structure 16. Then, the micromirror plate 14 can have a fixed position without applying any external force.

In order to connect the substrate 12 and the other micro-mechanical elements, the self-tilted micromirror 11 can further comprise at least one support structure as will be shown in FIGS. 2G-2J. The support structure is disposed on the substrate 12 and connected to the stiction plate 13 elastically. The self-tilted micromirror 11 can further comprise at least one substrate spring structure connecting the stiction plate 13 and the support structure. The substrate spring structure is configured to be stiff enough to hold the micro-mechanical elements in place at the perturbation and flexible enough such that the stiction force can overcome restoring force caused by the deformation of the micromirror plate spring structure 16 and the substrate spring structure to enable the stiction plate 13 to contact the substrate 12.

Figure 2A:
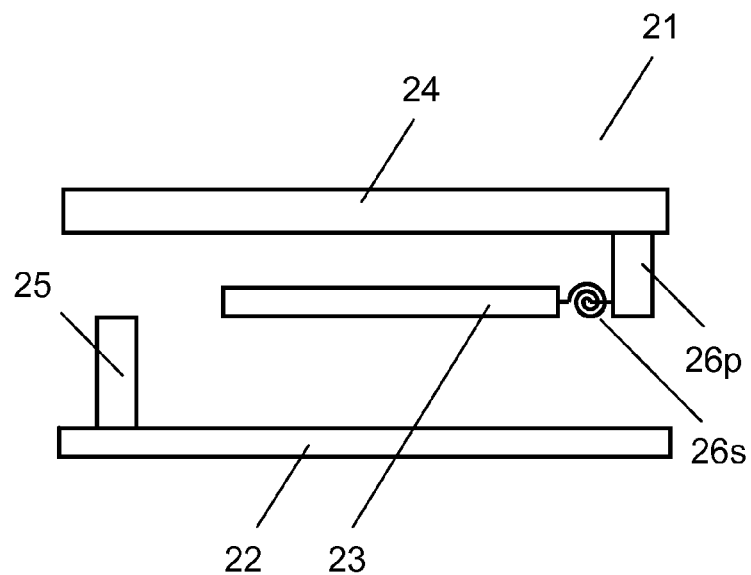
FIGS. 2A and 2B are schematic diagrams of embodiments of self-tiled micromirrors of the present invention with variation in geometry of the micromirror plate spring structure.
Figure 2B:
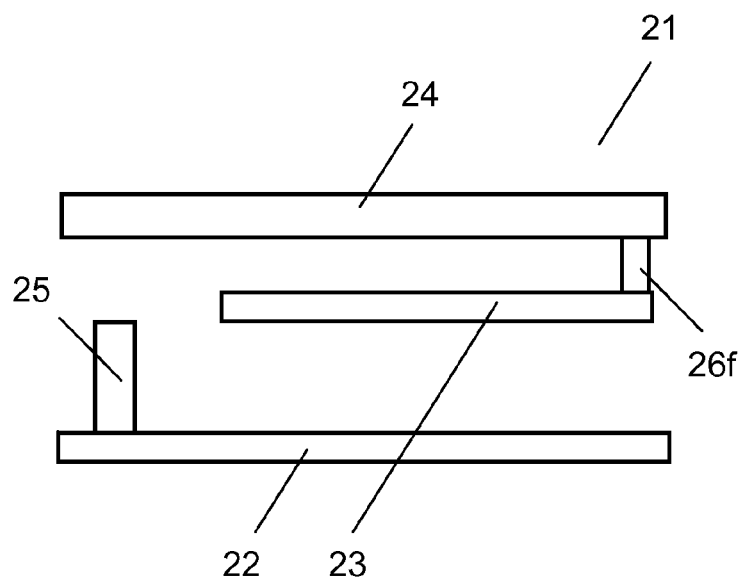
Figure 2C:
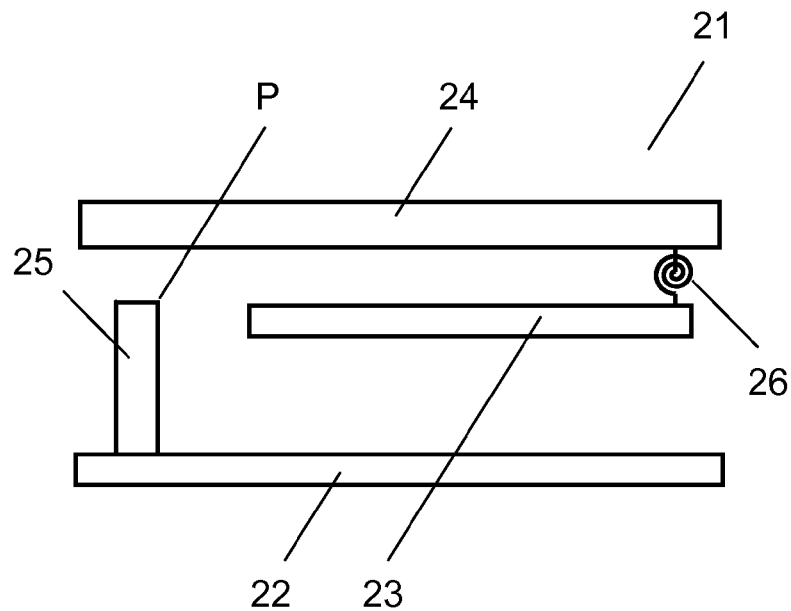
FIGS. 2C and 2D are schematic diagrams of embodiments of self-tiled micromirrors of the present invention with variation in disposition of the pivot structure.
Figure 2D:
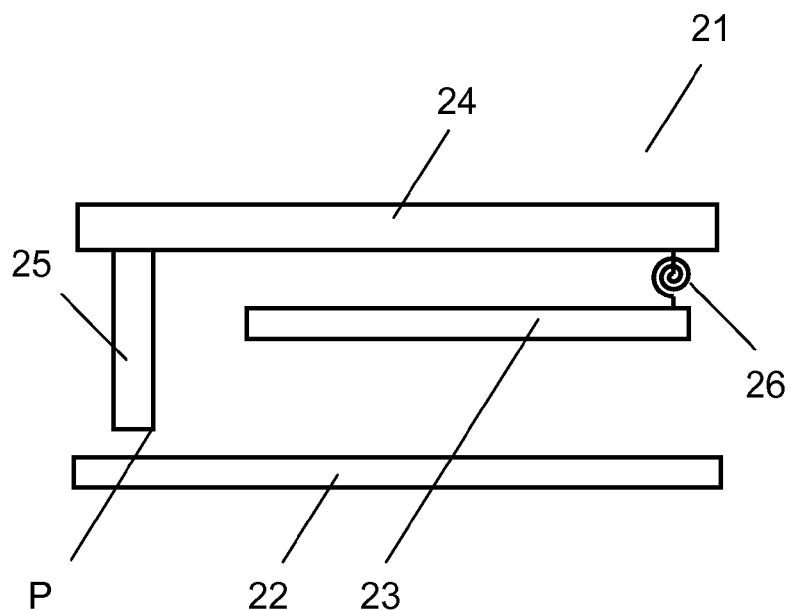
Figure 2E:
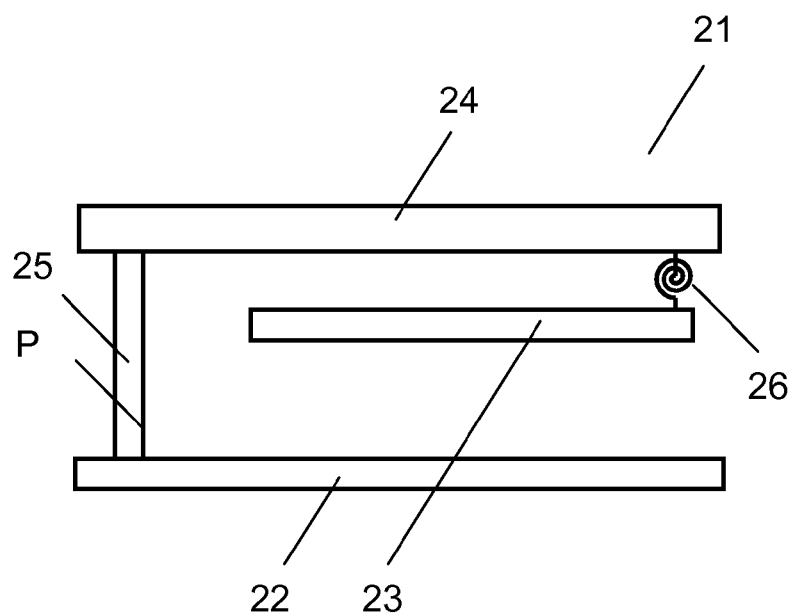
FIGS. 2E and 2F are schematic diagrams of embodiments of self-tiled micromirrors of the present invention with variation in connectivity of the pivot structure.
Figure 2F:
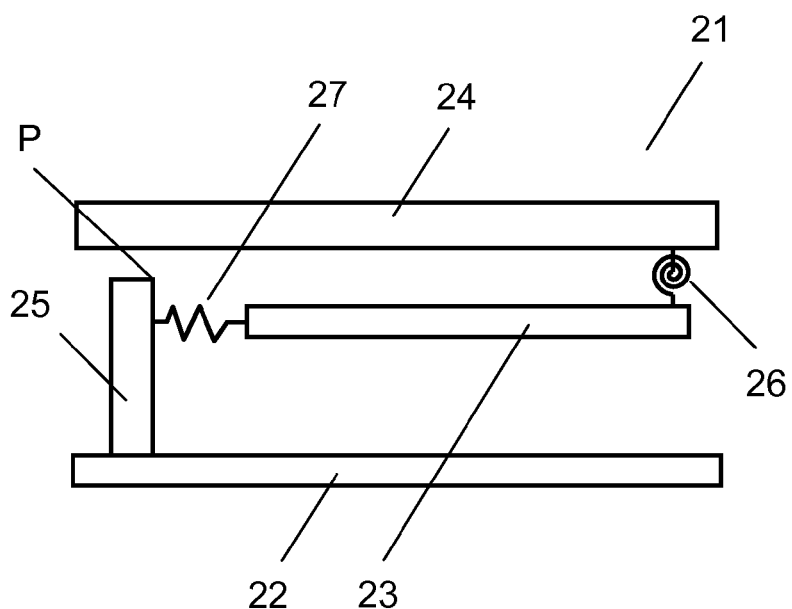
Figure 2G:
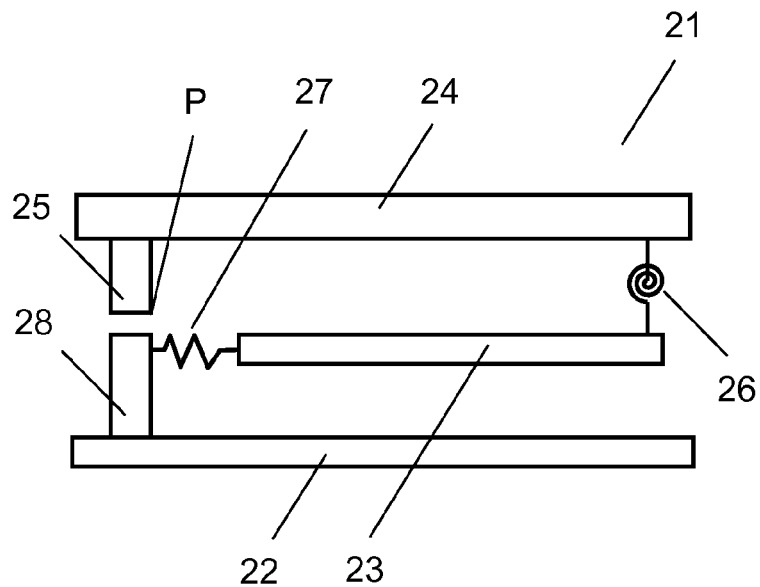
FIGS. 2G-2I are schematic diagrams of embodiments of self-tiled micromirrors of the present invention further comprising at least one support structure.
Figure 2H:
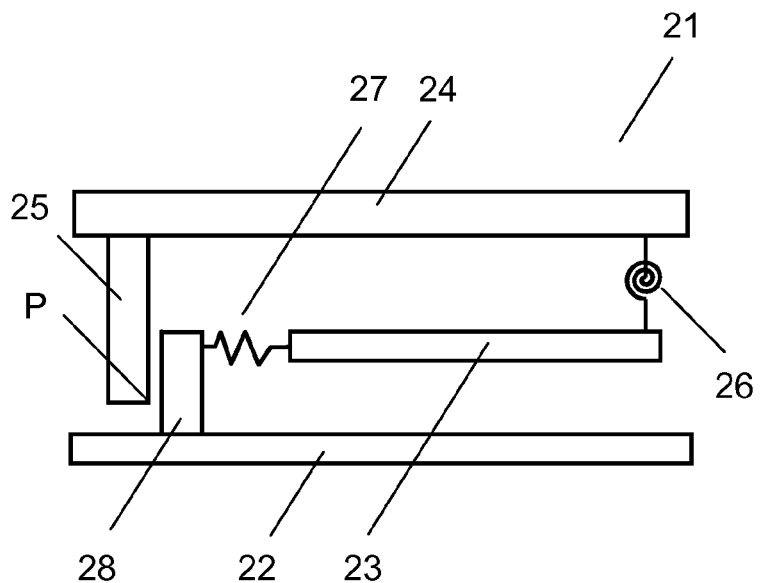
Figure 2I:
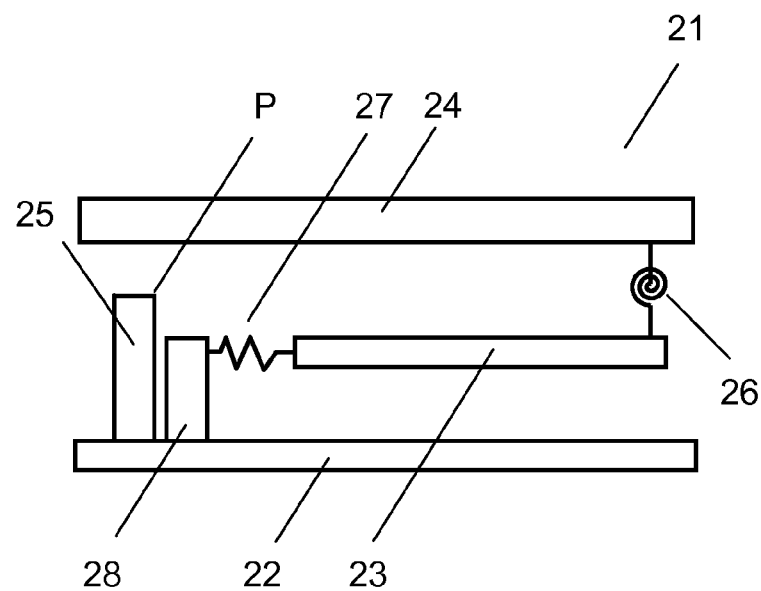
Figure 2J:
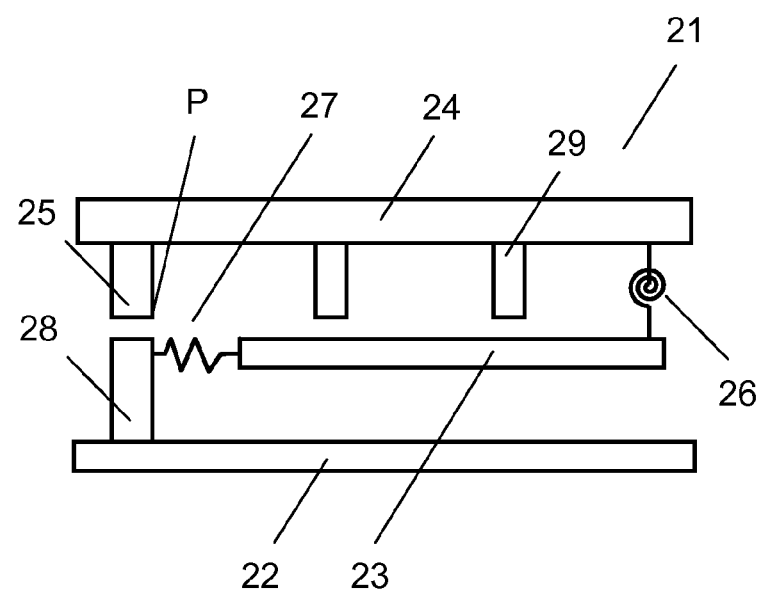
FIG. 2J is a schematic diagram of one embodiment of a self-tiled micromirror of the present invention further comprising at least one dimple structure.

To avoid unwanted stiction problems between the micromirror plate 14 and other micro-mechanical elements, the self-tilted micromirror 11 can further comprise at least one dimple structure disposed between the stiction plate 13 and the micromirror plate 14 and configured to provide a space between the stiction plate 13 and the micromirror plate 14 as will be shown in FIG. 2J. The dimple structure prevents unnecessary contact between the micromirror plate 14 and other micro-mechanical elements of the self-tilted micromirror 11.

The motion of the micromirror plate 14 is determined by the contact points P between the micromirror plate 14 and the pivot structure 15 and the contact points between the substrate 12 and stiction plate 13. To change these contact points, the geometry of the micro-mechanical elements of the self-tilted micromirror 11 can be varied; for example, the size of the self-tilted micromirror 11, the size, position, and number of the pivot structure 15, and so on. The linear and angular position of the micromirror plate after the releasing process can be predetermined by the design process of the geometry of the self-tilted micromirror 11.

FIG. 1A shows the stacked micro-mechanical elements of the self-tilted micromirror 11 before the releasing process. The self-tilted micromirror 11 is fabricated on the flat substrate 12. After the surface cleaning of the substrate 12, the pivot structure 15 is grown on the substrate 12. If necessary, a passivation layer can be deposited on top of the substrate 12 and the pivot structure 15. Then a first sacrificial layer S1 is overgrown on top of the substrate 12 and the pivot structure 15. The overgrown sacrificial layer S1 is then planarized by chemical mechanical polishing process. On the planarized surface, the stiction plate 13 is grown. Then, the micromirror plate spring structure 16 can be overgrown on the same layer as that of the stiction plate 13 or on the top of the stiction plate 13. A second sacrificial layer S2 is overgrown over the stiction plate 13 and the micromirror plate spring structure 16 and then planarized. On the planarized surface, the micromirror plate 14 is grown. The sacrificial layers S1 and S2 are removed in the releasing process of the micro-mechanical elements. During the releasing process, the stiction plate 13 is attracted to the substrate 12 by adhesion surface forces as shown in FIG. 1B.

Although FIGS. 1A and 1B shows the simplified exemplary embodiment in order to illustrate the essential elements and brief fabrication process of the self-tilted micromirror of the present invention, many variations in the geometry of the self-tilted micromirror are possible. The one skilled in the art will understand that the fabrication process has to be modified depending on the geometry of the self-tilted micromirror. For FIGS. 1-10, the similar elements are designated with the similar numerals to those of FIG. 1.

FIGS. 2A-2J shows possible embodiments of self-tiled micromirrors of the present invention with variation in geometry. All embodiments of the self-tilted micromirrors 21 of the present invention comprise a substrate 22, at least one stiction plate 23 configured to be attracted to the substrate 22 by adhesion force, a micromirror plate 24 connected to the stiction plate 23 elastically by at least one micromirror plate spring structure 26 and configured to have at least one motion when the stiction plate 23 is attracted to the substrate 22, and at least one pivot structure 25 disposed between the substrate 22 and the micromirror plate 24 and configured to provide a tilting point or area P for the motion of the micromirror plate 24, wherein the motion of the micromirror plate 24 is determined by the geometry of the micro-mechanical elements of the self-tilted micromirror 21.

FIGS. 2A and 2B are schematic diagrams of embodiments of self-tiled micromirrors of the present invention with variation in geometry of the micromirror plate spring structure. The micromirror plate spring structure can be a torsional spring structure or a flexible beam allowing the stiction plate to have a relative motion with respect to the micromirror plate. FIG. 2A shows a self-tilted micromirror 21 with at least one torsional spring 26s. The self-tilted micromirror 21 further comprises at least one micromirror plate post 26p. The torsional spring 26s can be fabricated in the same level with that of the stiction plate 23. The micromirror plate post 26p provides a space between the stiction plate 23 and the micromirror plate 24 and connects the micromirror plate 24 and the torsional spring 26s. Alternatively, the micromirror plate spring structure can be a simple flexible beam 26f connecting the stiction plate 23 and the micromirror plate 24 as shown in FIG. 2B. Using the flexible beam 26f for the micromirror plate spring structure, the fabrication process can become simpler and the area for the stiction plate can be increased.

FIGS. 2C and 2D are schematic diagrams of embodiments of self-tilted micromirrors of the present invention with variation in disposition of the pivot structure. The pivot structure 25 is configured to provide a tilting point or area P for the motion of the micromirror plate 24 when the stiction plate 23 is attracted to the substrate 22. FIG. 2C shows an exemplary embodiment, wherein the pivot structure 25 is disposed on the substrate 22. The open end of the pivot structure 25 is configured to contact the micromirror plate 24 and served as the tilting point P for the motion of the micromirror plate 24 when the stiction plate 23 is attracted to the substrate 22. Alternatively, the pivot structure 25 can be disposed on the micromirror plate 24 as shown in FIG. 2D. The open end of the pivot structure 25 is configured to contact the substrate 22 (or other support structure) and served as the tilting point P for the motion of the micromirror plate 24 when the stiction plate 23 is attracted to the substrate 22.

FIGS. 2E and 2F are schematic diagrams of embodiments of self-tilted micromirrors of the present invention with variation in connectivity of the pivot structure. In FIG. 2E, the pivot structure 25 connects the substrate 22 and the micromirror plate 24. The pivot structure 25 is configured to be flexible enough such that the stiction force can overcome restoring force caused by the deformation of the pivot structure 25 and the micromirror plate spring structure 26 to enable the stiction plate 23 to contact the substrate 22. A portion of the deformed pivot structure 25 becomes a tilting point or area P for the motion of the micromirror plate 24. Instead, the pivot structure can be configured to connect the substrate 22 and the stiction plate 23. FIG. 2F shows an exemplary embodiment of the present invention wherein the pivot structure 25 is disposed on the substrate 22 and connected to the stiction plate 23 elastically by at least one substrate spring structure 27. The open end of the pivot structure 25 is configured to contact the micromirror plate 24 and served as the tilting point or area P for the motion of the micromirror plate 24 when the stiction plate 23 is attracted to the micromirror plate 24. The substrate spring structure 27 is configured to be stiff enough to hold the micro-mechanical elements in place at the perturbation and flexible enough such that the stiction force can overcome restoring force caused by the deformation of the substrate spring structure 27 and the micromirror plate spring structure 26 to enable the stiction plate 23 to contact the substrate 22.

FIGS. 2G-2I are schematic diagrams of embodiments of self-tilted micromirrors of the present invention further comprising at least one support structure 28. The support structures 28 looks similar to the pivot structure 25 of FIG. 2F, but has a different function from that of the pivot structure 25. While the pivot structure 25 is configured to provide a tilting point or area, the support structure 28 is configured to connect the substrate 22 and the stiction plate 23. The support structure 28 is disposed on the substrate 22 and connected to the stiction plate 23 elastically by at least one substrate spring structure 27. The substrate spring structure 27 is configured to be stiff enough to hold the micro-mechanical elements in place at the perturbation and flexible enough such that the stiction force can overcome restoring force caused by the deformation of the substrate spring structure 27 and the micromirror plate spring structure 26 to enable the stiction plate 23 to contact the substrate 22. Also, the support structure 28 provides a space between the substrate 22 and the stiction plate 23. Longer the distance between the substrate 22 and the stiction plate 23, larger the motion (tilt angle) of the micromirror plate 24.

FIG. 2G shows a case that the pivot structure 25 is disposed on the micromirror plate 24 and the open end of the pivot structure 25 is configured to contact the support structure 28. FIG. 2H shows a case that the pivot structure 25 is disposed on the micromirror plate 24 and the open end of the pivot structure 25 is configured to contact the substrate 22. FIG. 2I shows a case that the pivot structure 25 is disposed on the substrate 22 and the open end of the pivot structure 25 is configured to contact the micromirror plate 24.

FIG. 2J is a schematic diagram of one embodiment of a self-tilted micromirror of the present invention further comprising at least one dimple structure 29 to avoid unwanted stiction problem between the micromirror plate 24 and other micro-mechanical elements. The dimple structure 29 is disposed between the stiction plate 23 and the micromirror plate 24 and configured to provide a space between the stiction plate 23 and the micromirror plate 24.

Although FIGS. 2A-2J show the cases with variation in individual micro-mechanical elements, the one skilled in the art will understand that these variations can be combined to satisfy the system requirement.

Figure 3A:
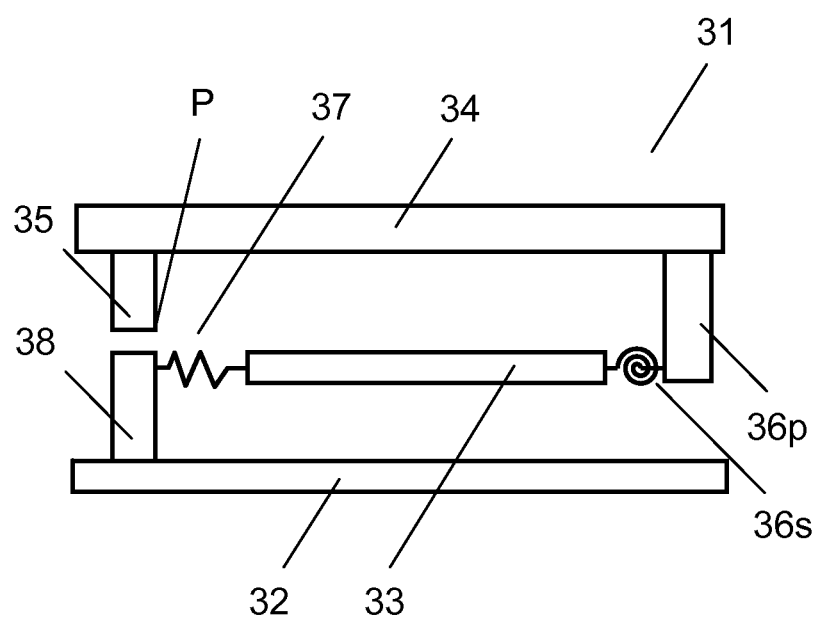
FIGS. 3A-3E are schematic diagrams of one exemplary embodiment of a self-tiled micromirror of the present invention illustrating its structure and motion in further detail.

FIGS. 3A-3E are schematic diagrams of one exemplary embodiment of a self-tilted micromirror of the present invention illustrating its structure and motion. The embodiment of FIG. 3A is used to illustrate the structure and motion of the self-tilted micromirror of the present invention in further detail. The self-tilted micromirror 31 of FIG. 3A comprises a plurality of micro-mechanical elements including a substrate 32, at least one stiction plate 33 configured to be attracted to the substrate 32, a micromirror plate 34 coupled to the stiction plate 33 elastically by at least one micromirror plate spring structure and configured to have at least one motion when the stiction plate 33 is attracted to the substrate 32, at least one support structure 38 disposed on the substrate 32 and connected to the stiction plate 33 elastically by at least one substrate spring structure 37, and at least one pivot structure 35 disposed on the micromirror plate 34 and configured to contact the support structure 38 when the stiction plate 33 is attracted to the substrate 32. The micromirror plate spring structure comprises at least one micromirror plate post 36P disposed on the micromirror plate 34 and at least one torsional spring 36s connecting the stiction plate 33 and the micromirror plate post 36p. The motion of the micromirror plate 34 is determined by the geometry of the micro-mechanical elements of the self-tilted micromirror 31.

Figure 3B:
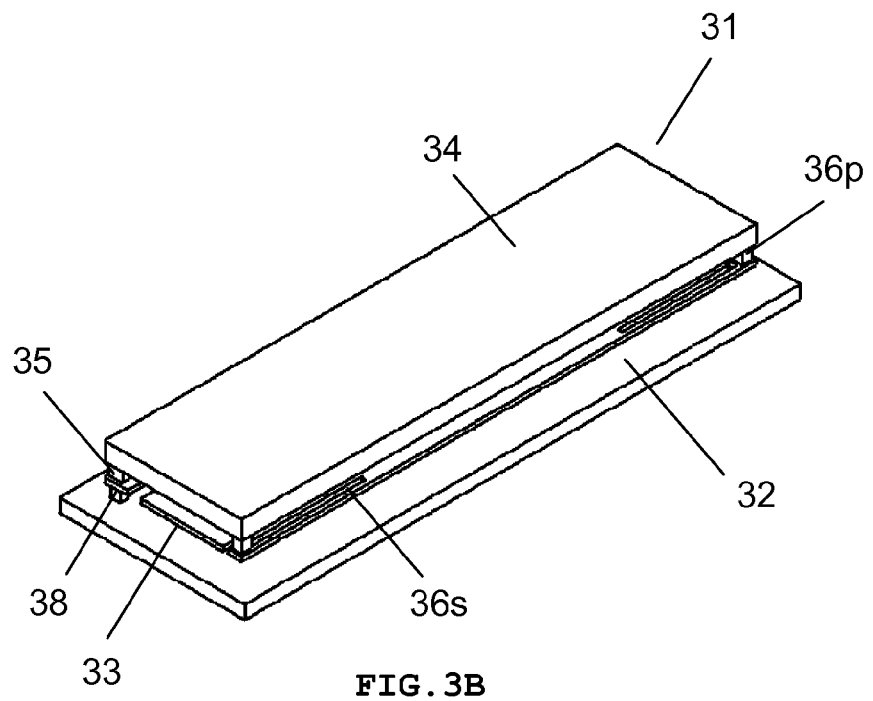
Figure 3C:
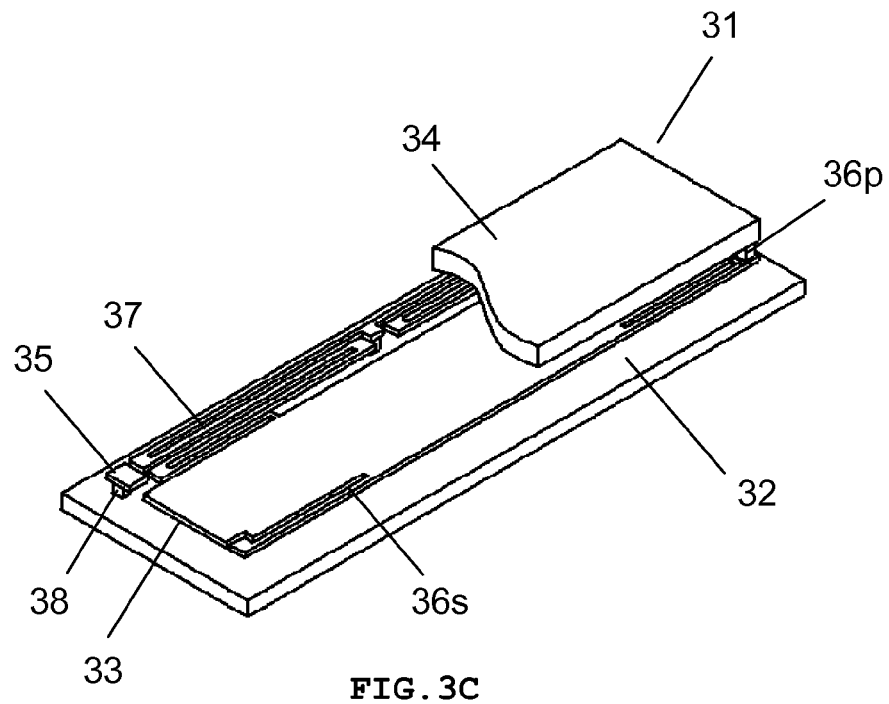

FIG. 3B is a schematic diagram of a three-dimensional view of the self-tilted micromirror 31 and FIG. 3C is a schematic diagram of a cut away view of the self-tilted micromirror 31. In this embodiment, several micro-mechanical elements including the stiction plate 33, the torsional spring 36s, and the substrate spring structure 37 can be fabricated in the same layer. The torsional spring 36s is configured to reduce or minimize the bending of the stiction plate 33 and/or the micromirror plate 34. Also, the substrate spring structure 37 is configured to be stiff enough to hold the micro-mechanical elements in place at the perturbation and flexible enough such that the stiction force can overcome restoring force caused by the deformation of the substrate spring structure 37 and the torsional spring 36s to enable the stiction plate 33 to contact the substrate 32.

Figure 3D:
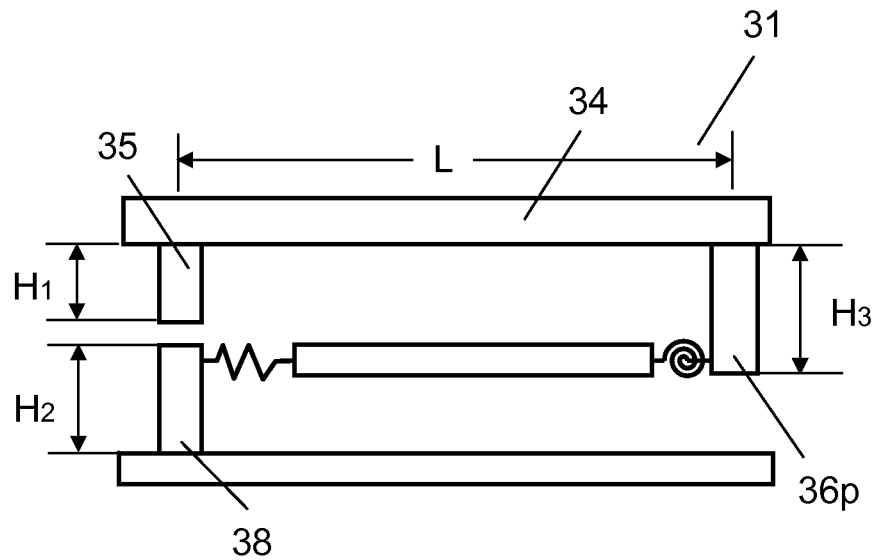
Figure 3E:
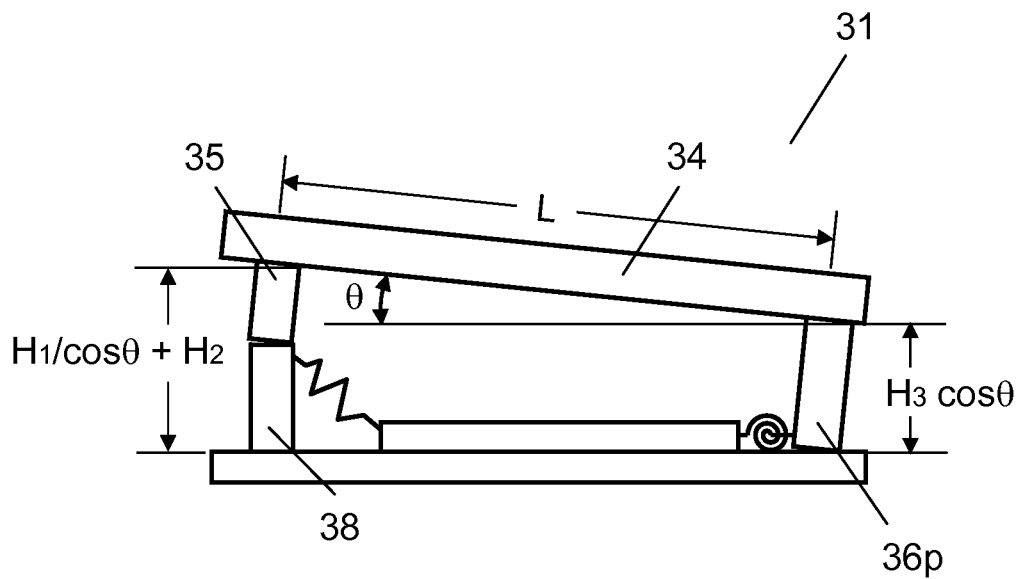

FIGS. 3D and 3E illustrate how the geometry of the micro-mechanical elements affects the motion of the micromirror plate 34, wherein FIGS. 3D and 3E show the self-tilted micromirror 31 before and after the motion of the micromirror plate 34, respectively. The geometry of the micro-mechanical elements determines the motion of the micromirror plate 34. In this particular embodiment, the tilt angle θ of the micromirror plate 34 and the geometry of the micro-mechanical elements have a following relationship:

$$H_1 + H_2 \cos\theta - H_3 \cos^2\theta - L \sin\theta = 0$$

where $H_1$ is the height of the pivot structure 35, $H_2$ is the height of the support structure 38, $H_3$ is the height of the micromirror plate post 36p, and L is the effective width of the micromirror plate 34. Once the required tilt angle θ is known, the dimensions of the micro-mechanical elements can be chosen so that the above constraint is satisfied. In a single self-tilted micromirror, all the variables $H_1$, $H_2$, $H_3$, and L can be used as design parameters that can be chosen to obtain the required motion of the micromirror plate 34. However, some systems may have further restrictions on choosing the dimensions of the micro-mechanical elements. For example, a system using multiple self-tilted micromirrors may require $H_1$, $H_2$, and $H_3$ to be fixed for all the self-tilted micromirrors in order to minimize the number of the fabrication processes. Then, the effective width of the micromirror plate 34 only remains as a variable to provide the required tilt angle θ as will be shown in FIG. 4.

FIGS. 4-8 show the effects of variation in the geometry of the micro-mechanical elements. FIGS. 4A-4D shows the effects of variation in the effective size of the micromirror plate using the embodiment of FIG. 3. Assume that two self-tilted micromirrors 41A and 41B in FIGS. 4A and 4B have the same dimensions for $H_1$, $H_2$, and $H_3$, wherein $H_1$ is the height of the pivot structures 45A and 45B, $H_2$ is the height of the support structures 48A and 48B, and $H_3$ is the height of the micromirror plate posts 46pA and 46pB. With two different effective sizes $L_A$ and $L_B$ of the micromirror plates 44A and 44B, the self-tilted micromirrors 41A and 41B can have different tilt angles $\theta_A$ and $\theta_B$ of the micromirror plates 44A and 44B as shown in FIGS. 4C and 4D, respectively. FIG. 4D shows both the micromirror plates 44A and 44B to show the difference between the tilt angles $\theta_A$ and $\theta_B$ of the micromirror plates 44A and 44B, clearly. Conversely, the dimensions of the effective sizes $L_A$ and $L_B$ of the micromirror plates 44A and 44B can be chosen in the design process by using geometrical constraints to obtain required tilt angles $\theta_A$ and $\theta_B$. Obtaining the required tilt angle by changing the size of the micromirror plate 44A and 44B is favorable for some systems forming an array of the self-tilted micromirrors, wherein the similar micro-mechanical elements of the self-tilted micromirrors can be fabricated in the same layer simultaneously, which allows simpler fabrication process.

A required tilt angle of the micromirror plate can be obtained by changing the position of the pivot structure.

Figure 5A:
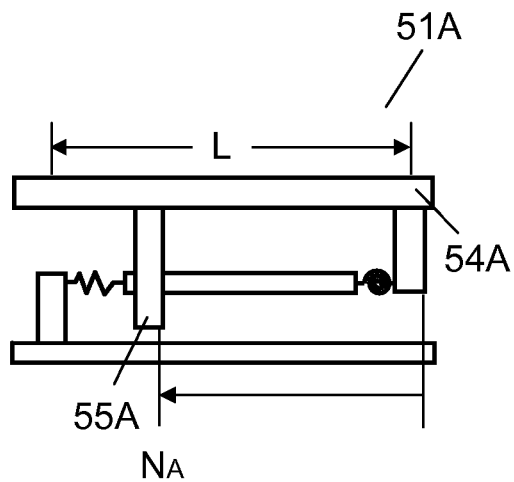
FIGS. 5A-5D are schematic diagrams showing the effects of variation in the position of the pivot structure disposed on the micromirror plate.
Figure 5B:
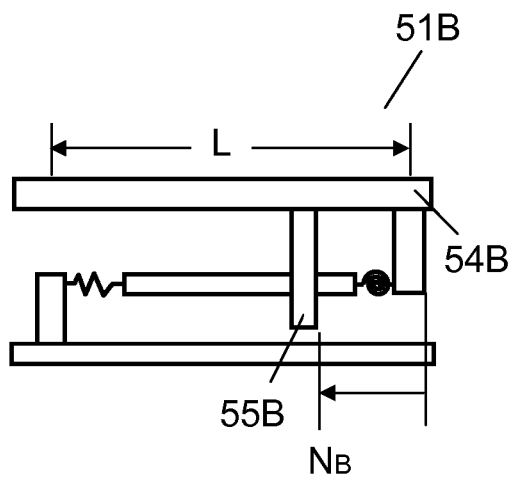
Figure 5C:
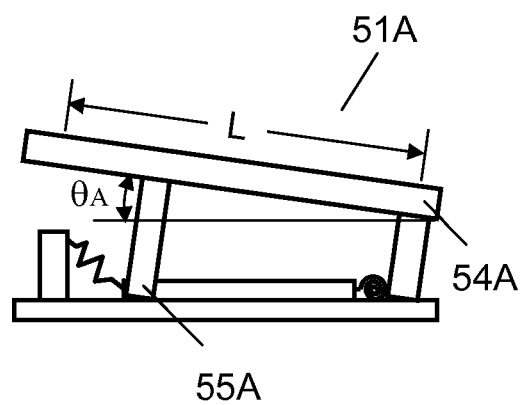
Figure 5D:
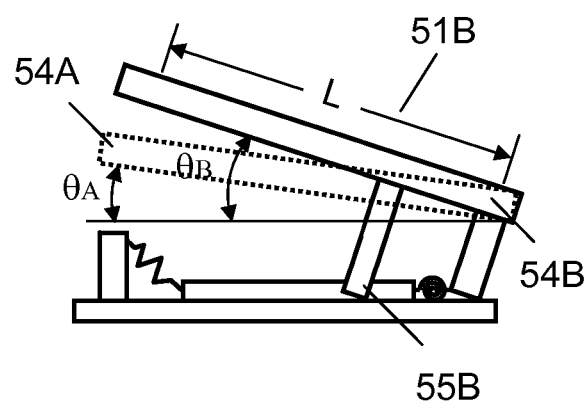

FIGS. 5A-5D show an example that required tilt angles are obtained by varying the position of the pivot structure using the embodiment of FIG. 2H with the micromirror plate spring structure comprising at least one torsional spring and at least one micromirror plate post. Assume that two self-tilted micromirrors 51A and 51B in FIGS. 5A and 5B have the same geometry except the positions $N_A$ and $N_B$ of the pivot structures 55A and 55B on the micromirror plate 54A and 54B. By positioning the pivot structures 55A and 55B in two different positions $N_A$ and $N_B$, the self-tilted micromirrors 51A and 51B can have different tilt angles $\theta_A$ and $\theta_B$ of the micromirror plates 54A and 54B as shown in FIGS. 5C and 5D, respectively. FIG. 5D shows both the micromirror plates 54A and 54B to show the difference between the tilt angles $\theta_A$ and $\theta_B$ of the micromirror plates 54A and 54B, clearly. Conversely, the positions $N_A$ and $N_B$ of the pivot structures 55A and 55B can be chosen in the design process by using geometrical constraints to obtain required tilt angles $\theta_A$ and $\theta_B$. Obtaining the required tilt angle by changing the position $N_A$ and $N_B$ of the pivot structure 55A and 55B is favorable for some systems forming an array of the self-tilted micromirrors, wherein the similar micro-mechanical elements of the self-tilted micromirrors can be fabricated in the same layer simultaneously, which allows simpler fabrication process. Also, unlike the case of FIG. 4, all micromirror plates in the array can have the identical size L while having different tilt angles.

Figure 6A:
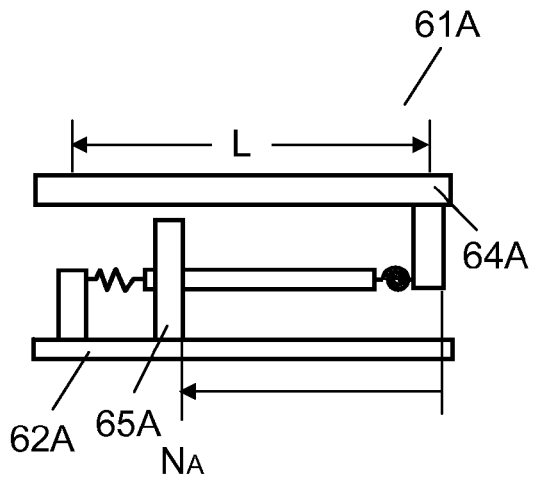
FIGS. 6A-6D are schematic diagrams showing the effects of variation in the position of the pivot structure disposed on the substrate.
Figure 6B:
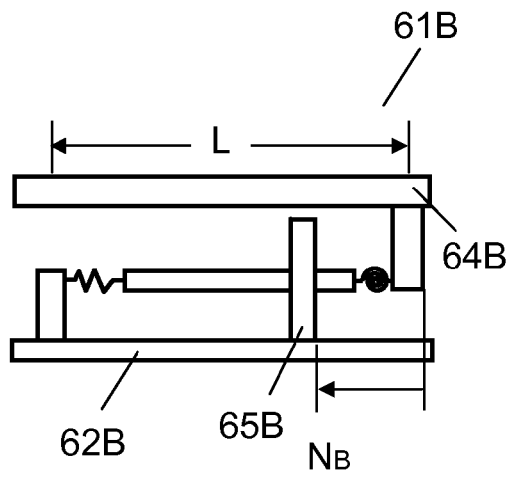
Figure 6C:
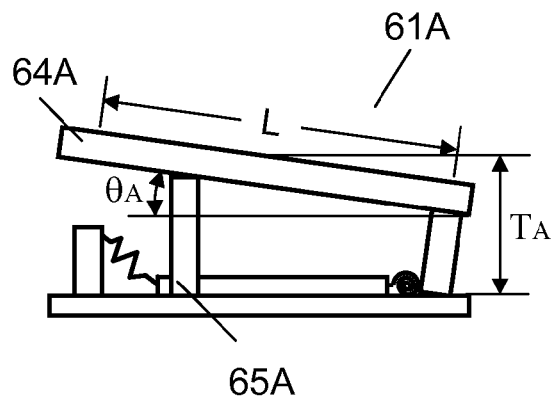
Figure 6D:
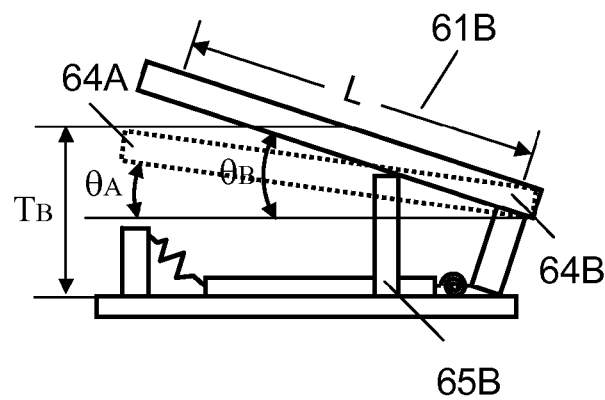

FIGS. 6A-6D show another example that required tilt angles are obtained by varying the position of the pivot structure using the embodiment of FIG. 2I with the micromirror plate spring structure comprising at least one torsional spring and at least one micromirror plate post. Assume that two self-tilted micromirrors 61A and 61B in FIGS. 6A and 6B have the same geometry except the positions $N_A$ and $N_B$ of the pivot structures 65A and 65B on the substrate 62A and 62B. By positioning the pivot structures 65A and 65B in two different positions $N_A$ and $N_B$, the self-tilted micromirrors 61A and 61B can have different tilt angles $\theta_A$ and $\theta_B$ of the micromirror plates 64A and 64B as shown in FIGS. 6C and 6D, respectively. FIG. 6D shows both the micromirror plates 64A and 64B to show the difference between the tilt angles $\theta_A$ and $\theta_B$ of the micromirror plates 64A and 64B, clearly. Conversely, the positions $N_A$ and $N_B$ of the pivot structures 65A and 65B can be chosen in the design process by using geometrical constraints to obtain required tilt angles $\theta_A$ and $\theta_B$. Obtaining the required tilt angle by changing the position $N_A$ and $N_B$ of the pivot structure 65A and 65B is favorable for some systems forming an array of the self-tilted micromirrors, wherein the similar micro-mechanical elements of the self-tilted micromirrors can be fabricated in the same layer simultaneously, which allows simpler fabrication process. Also, unlike the case of FIG. 4, all micromirror plates in the array can have the identical size L while having different tilt angles.

As the result of tilt of the micromirror plate, the micromirror plate can have translational motion as well as rotational motion. For example, the micromirror plates 64A and 64B can have different linear positions $T_A$ and $T_B$ as shown in FIGS. 6C and 6D. However, in this case, the translational motion and the rotational motion of the micromirror plate are coupled each other so it is difficult to make the micromirror plate have required translational motion and rotational motion together. This problem can be resolved by introducing more design parameters. FIGS. 7 and 8 show exemplary embodiments capable of providing the micromirror plate with independent translational motion and rotational motion. FIGS. 7A-7D show two self-tilted micromirrors 71A and 71B providing the micromirror plates 74A and 74B with independent translational motion and rotational motion using the embodiment of FIG. 2H. The rotational motion is varied by changing the position of the pivot structure 75A and 75B on the micromirror plates 74A and 74B and the translational motion is varied by changing the size of the micromirror plates 74A and 74B. In this example, two self-tilted micromirrors have the same positions N of the pivot structures 75A and 75B and different sizes $L_A$ and $L_B$ of the micromirror plates 74A and 74B to show independent translational motion. Therefore, the two self-tilted micromirrors 71A and 71B have the same tilt angle θ of the micromirror plates 74A and 74B but different linear positions $T_A$ and $T_B$, of the micromirror plates 74A and 74B, respectively. FIG. 7D shows both the micromirror plates 74A and 74B to show the difference between the linear positions $T_A$ and $T_B$ of the micromirror plates 74A and 74B, clearly.

FIGS. 8A-8D show two self-tilted micromirrors 81A and 81B providing the micromirror plates 84A and 84B with independent translational motion and rotational motion using the embodiment of FIG. 2I. The rotational motion is varied by changing the position of the pivot structure 85A and 85B on the substrate 82A and 82B and the translational motion is varied by changing the size of the micromirror plates 84A and 84B. In this example, two self-tilted micromirrors have the same positions N of the pivot structures 85A and 85B and different sizes $L_A$ and $L_B$ of the micromirror plates 84A and 84B to show independent translational motion. Therefore, the two self-tilted micromirrors 81A and 81B have the same tilt angle θ of the micromirror plates 84A and 84B but different translational positions $T_A$ and $T_B$ of the micromirror plates 84A and 84B, respectively. FIG. 8D shows both the micromirror plates 84A and 84B to show the difference between the translational position $T_A$ and $T_B$ of the micromirror plates 84A and 84B, clearly.

As in the cases of FIGS. 5-8, the position of the pivot structure can be used as one of design parameters to provide a required motion of the micromirror plate. Depending on the position of the pivot structure, some structural modification may be required so that the motions of the pivot structure and the stiction plate do not hinder the movements of each other. Especially, for the array of the self-tilted micromirrors, it is desirable that each self-tilted micromirror has more common identical micro-mechanical elements to simplify the design process and fabrication.

Figure 9A:
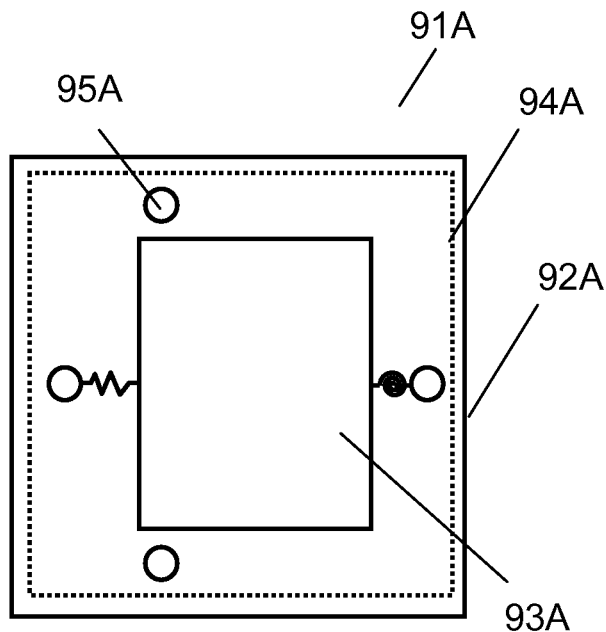
FIGS. 9A-9B are schematic diagrams showing the pivot structures disposed on the outer rim of the micromirror plates or substrates.
Figure 9B:
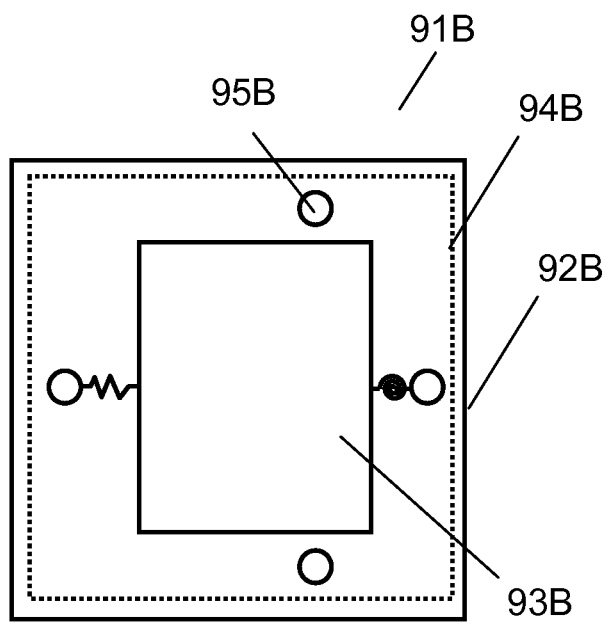
Figure 10A:
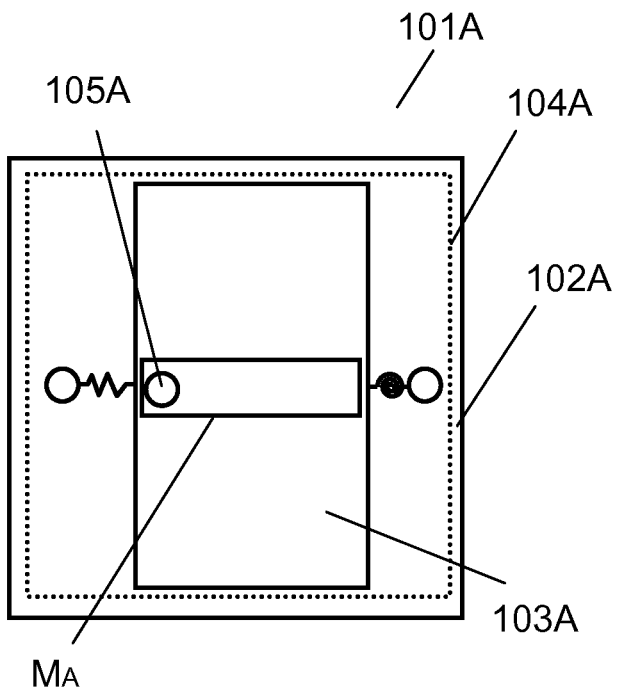
FIGS. 10A-10B are schematic diagrams showing the pivot structures moving through holes in stiction plates.
Figure 10B:
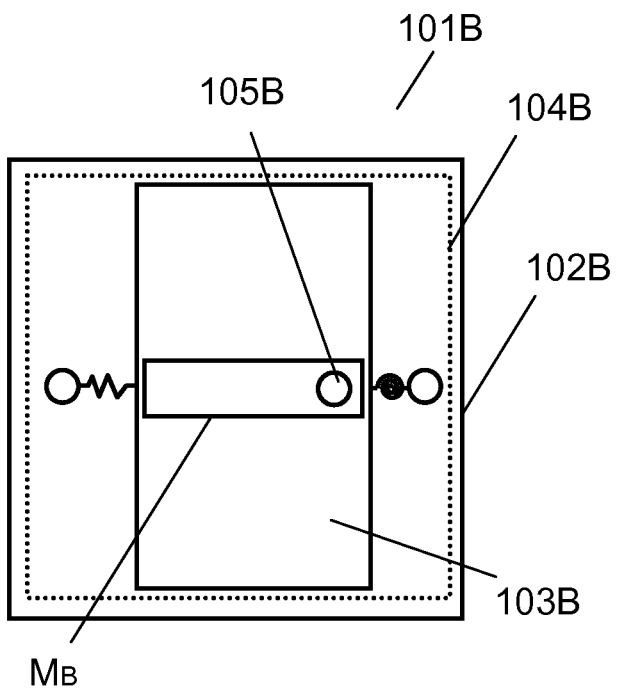

FIGS. 9 and 10 are schematic diagrams of the top view of the self-tilted micromirrors showing possible configurations of the pivot structures and the stiction plates. In FIGS. 9A and 9B, two self-tilted micromirrors 91A and 91B have common identical micro-mechanical elements except the position of the pivot structure 95A and 95B as shown in the embodiments of FIGS. 5-8. The pivot structures 95A and 95B can be disposed on the outer rim of the micromirror plates 94A and 94B or the substrate 92A and 92B as shown in FIG. 9 so that the stiction plates 93A and 93B and the pivot structures 95A and 95B do not hinder the movements of each other, respectively. Alternatively, the stiction plates 103A and 103B can be configured to have at least one hole MA and MB so that the pivot structure 105A and 105B can contact the substrates 102A and 102B or the micromirror plates 104A and 104B through the holes MA and MB as shown in the self-tilted micromirrors 101A and 101B of FIG. 10, respectively.

Figure 11:
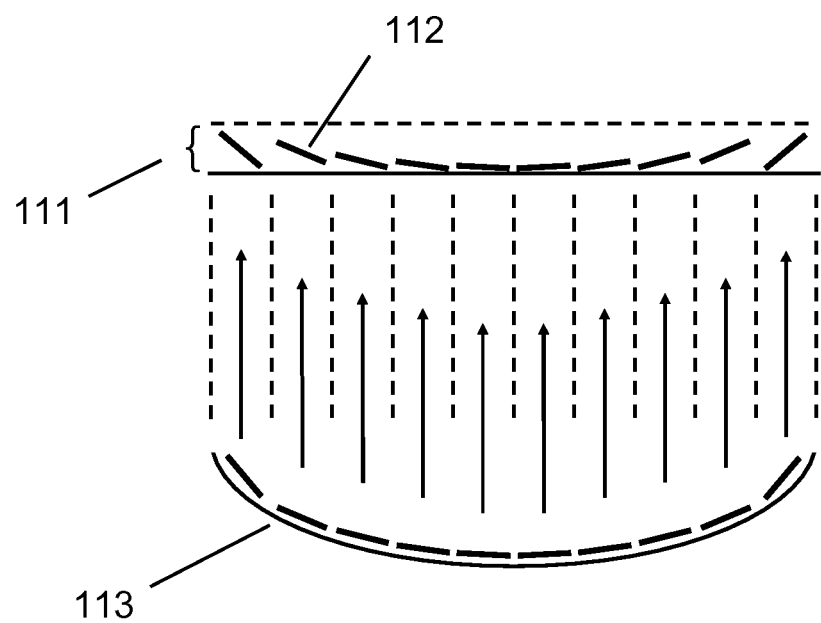
FIG. 11 is a schematic diagram showing the principle of a Micromirror Array Lens.
Figure 12:
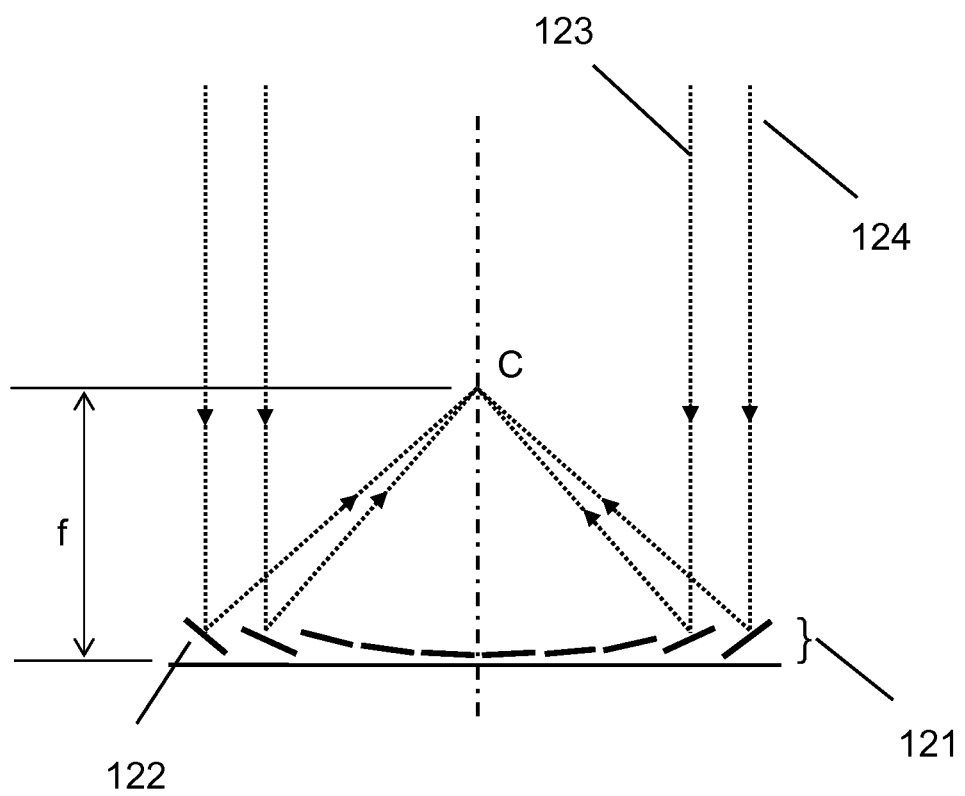
FIG. 12 is a schematic diagram showing a Micromirror Array Lens forming an optical surface profile to satisfy convergence condition and/or phase matching condition.

FIGS. 11 and 12 illustrate the principle of the Micromirror Array Lens. To be a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surfaces of conventional reflective lenses are formed to have all light rays scattered by one point of an object be converged into one point of the image plane and have the optical path length of all converging light rays be the same. The Micromirror Array Lens satisfies these conditions in a different way. FIG. 11 is a schematic diagram showing the principle of a Micromirror Array Lens. The Micromirror Array Lens 111 comprises a plurality of micromirrors 112 and replaces an ordinary single-bodied optical surface 113. The Micromirror Array Lens 111 forms a reflective Fresnel lens or a diffractive Fresnel lens that satisfies the focusing properties of the ordinary single-bodied optical surface 113.

Since each micromirror has the same function as a mirror, the reflective surface of the micromirror is made of metal, metal compound, multi-layered dielectric material, or other materials with high reflectivity such as aluminum coated with multi-layer dielectric material, aluminum coated with antioxidant, silver coated with multi-layer dielectric material, silver coated with antioxidant, gold, and gold coated with multi-layer dielectric material. The surface of the micromirror can be made to have high reflectivity using many known microfabrication processes.

The micromirrors in the Micromirror Array Lens can have various shapes including fan shape, triangular shape, rectangular shape, square shape, hexagonal shape, and circular shape depending on the geometry of the optical element that the Micromirror Array Lens reproduces. A Micromirror Array Lens comprising fan shape micromirrors is appropriate to reproduce revolution symmetric free surfaces. A Micromirror Array Lens comprising square or rectangular shape micromirrors is appropriate to reproduce line symmetric free surfaces. Also, a Micromirror Array Lens comprising triangular or hexagonal shape micromirrors is appropriate to reproduce rotational symmetric free surfaces such as with six-fold rotational symmetry or with arbitrary shape and/or size.

FIG. 12 is a schematic diagram showing a Micromirror Array Lens 121 forming optical surface profiles to satisfy convergence condition and/or phase matching condition. The optical surface profile of the Micromirror Array Lens 121 comprising micromirrors 122 is configured to satisfy the convergence condition, wherein arbitrary scattered light rays 123, 124 are converged into one point C on an image plane by the translational and/or rotational motions of each micromirror. Also, the optical surface profile of the Micromirror Array Lens 121 is configured to satisfy the phase matching condition, wherein the phases of all converging light rays at the converging point C on the image plane are adjusted to be the same by the translational and/or rotational motion of each micromirror 122. Even though the optical path lengths of light rays 123, 124 converged by the Micromirror Array Lens 121 are different from those of an equivalent conventional reflective lens, the same phase condition is satisfied by adjusting the phases of light rays 123, 124 because the phase of light is periodic. The required maximum translational displacement is at least half wavelength of light.

It is desired that each of the micromirrors 122 has a curvature because the ideal shape of a conventional reflective lens has a curvature. If the size of the flat micromirror 122 is small enough, the aberration of the lens comprising flat micromirrors 122 is also small enough. In this case, the micromirror 122 does not need a curvature. The micromirrors 122 can be configured to have motions required to make the Micromirror Array Lens 121 have a focal length f.

Figure 13:
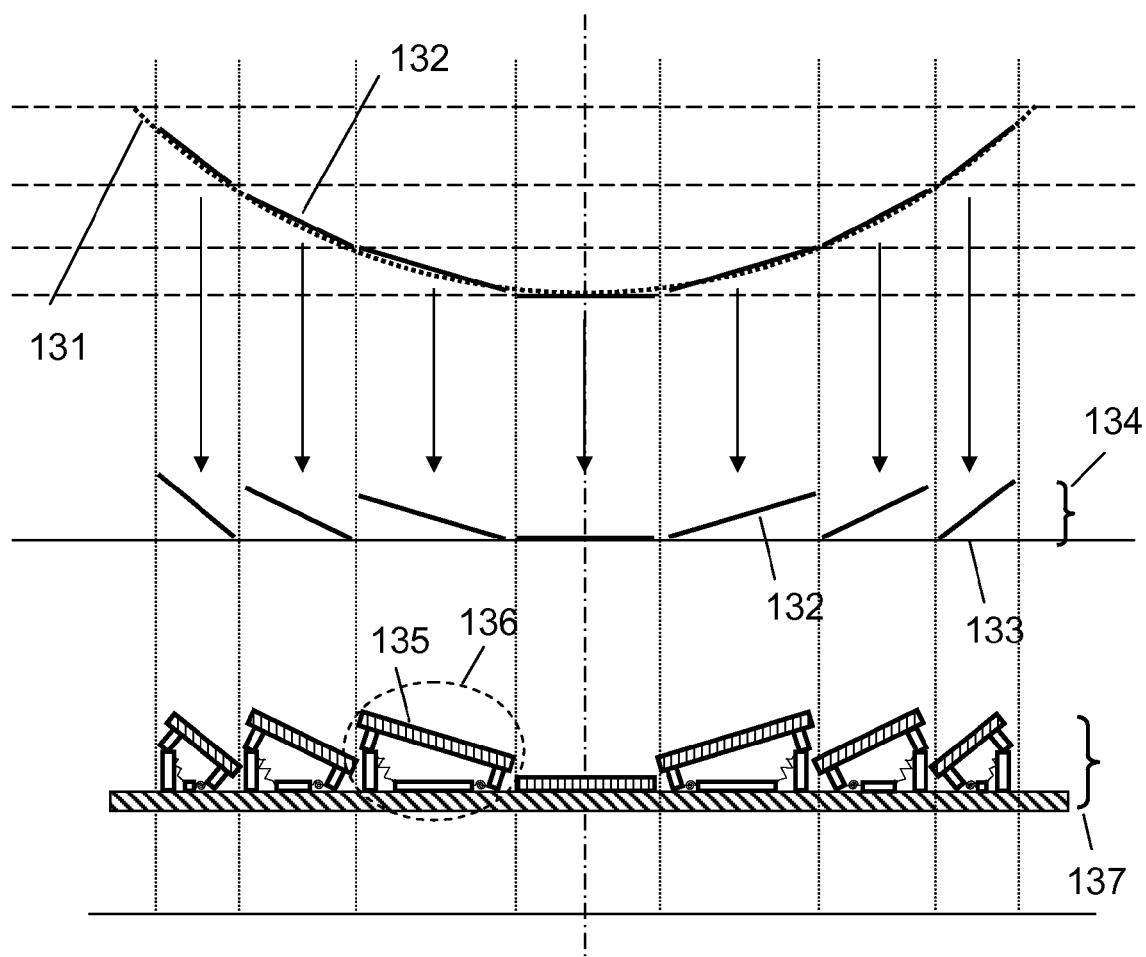
FIGS. 13-16 show exemplary embodiments of the Micromirror Array Lenses with self-tilted micromirrors.
Figure 14:
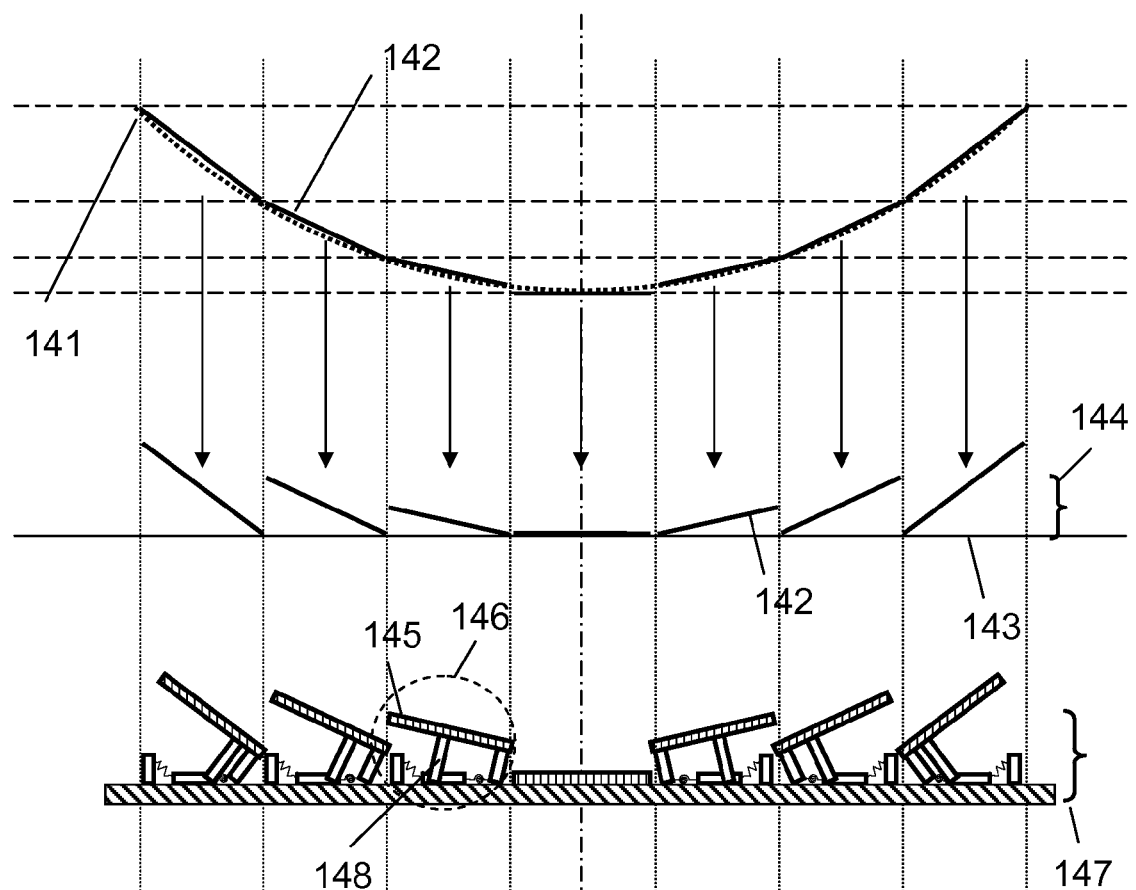
Figure 15:
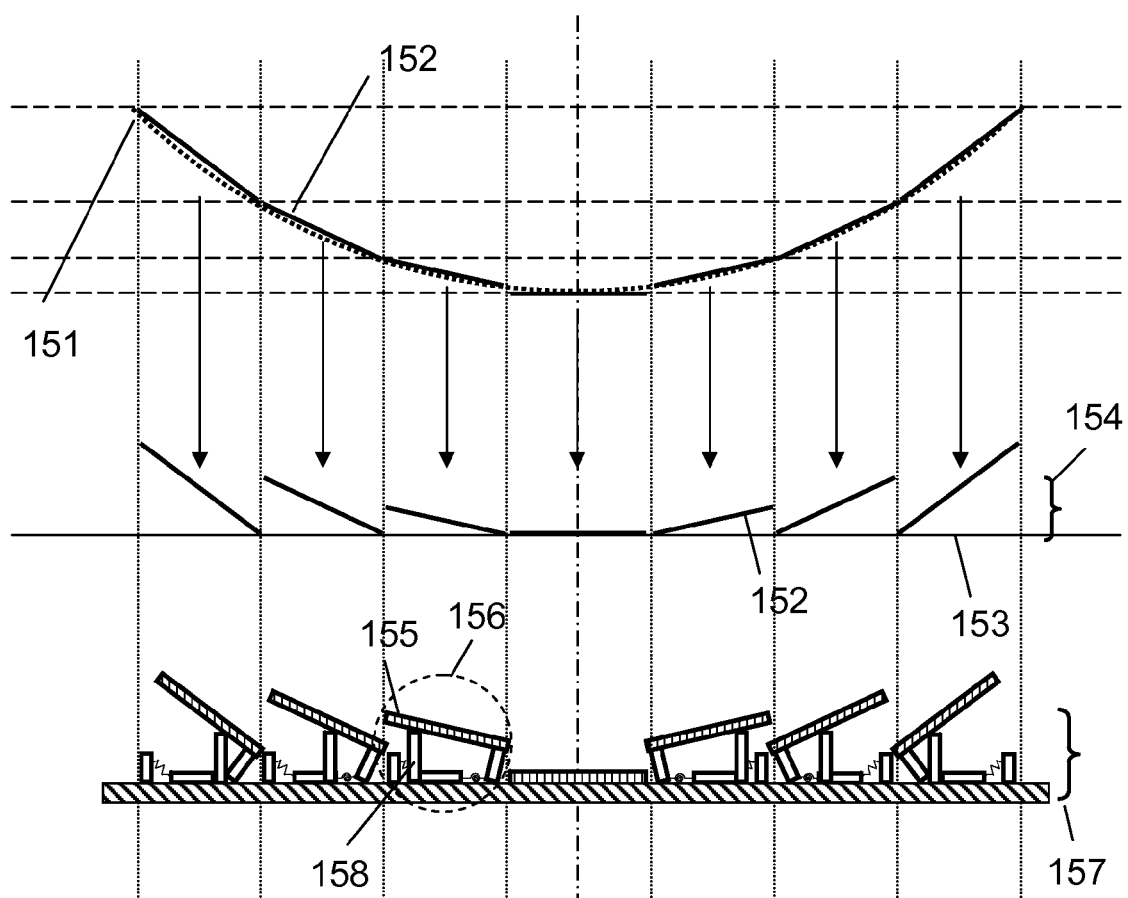

A Micromirror Array Lens with self-tilted micromirrors of the present invention comprises a plurality of self-tilted micromirrors and configured to form a designed optical surface profile by self-tilted micromirrors. Each self-tilted micromirror comprises a substrate, at least one stiction plate configured to be attracted to the substrate by adhesion force, a micromirror plate having a reflective surface, coupled to the stiction plate elastically and configured to have a required motion when the stiction plate is attracted to the substrate, and at least one pivot structure disposed between the substrate and the micromirror plate and configured to provide a tilting point or area for the motion of the micromirror plate. The designed optical surface profile determines the required motion of the micromirror plate and a surface profile shape memory is built in the structure of the micro-mechanical elements of the self-tilted micromirrors so that each micromirror plate has the required motion. FIGS. 13-15 show exemplary embodiments of the Micromirror Array Lens with self-tilted micromirrors.

FIG. 13 shows how a Micromirror Array Lens reproduces a conventional mirror surface using self-tilted micromirrors of FIG. 4, wherein a surface profile shape memory is built in the sizes of the micromirror plates. The upper part of the figure shows the conventional mirror surface 131 for an optical system. Once the mirror surface 131 to be reproduced is given, the required optical surface profile of the Micromirror Array Lens can be readily designed. The mirror surface 131 is divided into small pieces and each piece is replaced with a plate 132 having a slope that is the same as a local gradient of the corresponding piece. These plates 132 are then arranged on a flat surface 133. The middle part of the figure shows a designed optical surface profile 134. Each plate 132 is represented by a micromirror plate 135 of a self-tilted micromirror 136. The micromirror plate 135 is configured to have the same slope as that of the corresponding plate 132. In this example, the size of the micromirror plate 135 is a design parameter so selected such that the micromirror plate 135 has the required slope. The optical surface profile of the Micromirror Array Lens 137 formed by self-tilted micromirrors 136 is the designed optical surface profile 134 reproducing the conventional mirror surface 131.

FIG. 14 shows how a Micromirror Array Lens reproduces a conventional mirror surface using self-tilted micromirrors of FIG. 5, wherein a surface profile shape memory is built in the positions of the pivot structures disposed on the micromirror plate. The upper part of the figure shows the conventional mirror surface 141 for an optical system. Once the mirror surface 141 to be reproduced is given, the required optical surface profile of the Micromirror Array Lens can be readily designed. The mirror surface 141 is divided into small pieces having the same width and each piece is replaced with a plate 142 having a slope that is the same as a local gradient of the corresponding piece. These plates 142 are then arranged on a flat surface 143. The middle part of the figure shows a designed optical surface profile 144. Each plate 142 is represented by a micromirror plate 145 of a self-tilted micromirror 146. The micromirror plate 145 is configured to have the same slope as that of the corresponding plate 142. In this example, the position of the pivot structure 148 is a design parameter so selected such that the micromirror plate 145 has the required slope. The optical surface profile of the Micromirror Array Lens 147 formed by self-tilted micromirrors 146 is the designed optical surface profile 144 reproducing the conventional mirror surface 141.

FIG. 15 shows how a Micromirror Array Lens reproduces a conventional mirror surface using self-tilted micromirrors of FIG. 6, wherein a surface profile shape memory is built in the positions of the pivot structures disposed on the substrate. The upper part of the figure shows the conventional mirror surface 151 for an optical system. Once the mirror surface 151 to be reproduced is given, the required optical surface profile of the Micromirror Array Lens can be readily designed. The mirror surface 151 is divided into small pieces having the same width and each piece is replaced with a plate 152 having a slope that is the same as a local gradient of the corresponding piece. These plates 152 are then arranged on a flat surface 153. The middle part of the figure shows a designed optical surface profile 154. Each plate 152 is represented by a micromirror plate 155 of a self-tilted micromirror 156. The micromirror plate 155 is configured to have the same slope as that of the corresponding plate 152. In this example, the position of the pivot structure 158 is a design parameter so selected such that the micromirror plate 155 has the required slope. The optical surface profile of the Micromirror Array Lens 157 formed by self-tilted micromirrors 156 is the designed optical surface profile 154 reproducing the conventional mirror surface 151.

Figure 16:
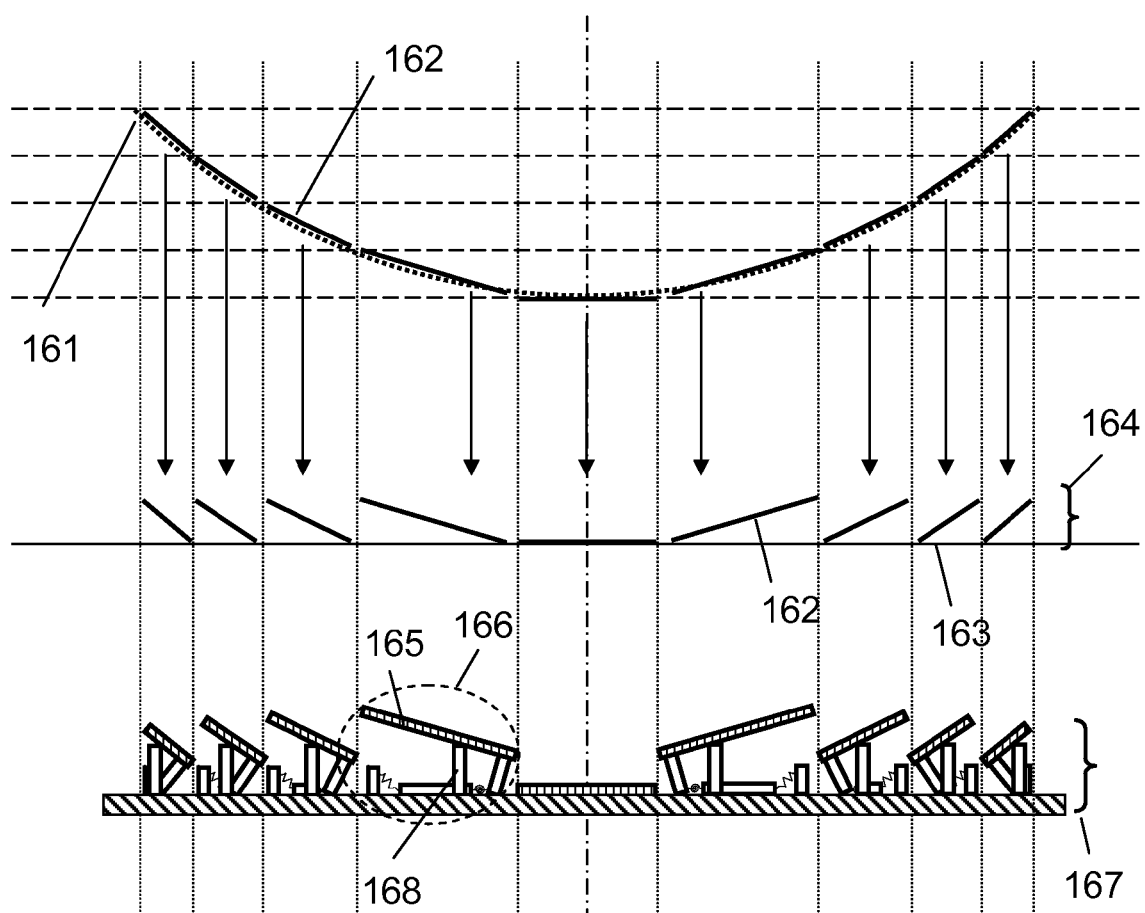

FIG. 16 shows how a Micromirror Array Lens reproduces a conventional mirror surface using self-tilted micromirrors of FIG. 8 and satisfies the phase matching condition, wherein a surface profile shape memory is built in the positions of the pivot structures disposed on the substrate and the sizes of the micromirror plates. The upper part of the figure shows the conventional mirror surface 161 for an optical system. Once the mirror surface 161 to be reproduced is given, the required optical surface profile of the Micromirror Array Lens can be readily designed. The mirror surface 161 is divided into small pieces considering the phase difference and each piece is replaced with a plate 162 having a slope that is the same as a local gradient of the corresponding piece. The size of the plate 162 is determined by the phase difference between the neighboring plates 162. The phase difference can be selected as a function of wavelength of the light. These plates 162 are then arranged on a flat surface 163. The middle part of the figure shows a designed optical surface profile 164. Each plate 162 is represented by a micromirror plate 165 of a self-tilted micromirror 166. The micromirror plate 165 is configured to have the same slope as that of the corresponding plate 162. In this example, the position of the pivot structure 168 and size of the micromirror plate 165 are design parameters so selected such that the micromirror plate 165 has the required slope. The optical surface profile of the Micromirror Array Lens 167 formed by self-tilted micromirrors 166 is the designed optical surface profile 164 reproducing the conventional mirror surface 161 and satisfy the phase matching condition While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A Micromirror Array Lens with self-tilted micromirrors comprising a plurality of self-tilted micromirrors and configured to form a designed optical surface profile by self-tilted micromirrors to function as a lens, wherein each self-tilted micromirror comprises
   a) a substrate;
   b) at least one stiction plate configured to be attracted to the substrate by adhesion force;
   c) a micromirror plate having a reflective surface, coupled to the stiction plate elastically and configured to have a required motion when the stiction plate is attracted to the substrate; and d) at least one pivot structure disposed between the substrate and the micromirror plate and configured to provide a tilting point or area for the motion of the micromirror plate;

wherein the designed optical surface profile determines the required motion of the micromirror plate and a surface profile shape memory is built in the self-tilted micromirrors so that each micromirror plate has the required motion.

2. The Micromirror Array Lens with self-tilted micromirrors of claim 1 wherein the required motion of the micromirror plate determines a size of the micromirror plate.

3. The Micromirror Array Lens with self-tilted micromirrors of claim 1, wherein the required motion of the micromirror plate determines a size or a position or both a size and a position of the pivot structure.

4. The Micromirror Array Lens with self-tilted micromirrors of claim 1, wherein the Micromirror Array Lens with the designed optical surface profile have an optical focusing power.

5. The Micromirror Array Lens with self-tilted micromirrors of the claim 1, wherein the micromirror plate is coupled to the stiction plate elastically by at least one micromirror plate spring structure.

6. The Micromirror Array Lens with self-tilted micromirrors of the claim 5, wherein the self-tilted micromirror further comprises at least one micromirror plate post configured to provide a space between the micromirror plate and the stiction plate and connecting the micromirror plate and the micromirror plate spring structure.

7. The Micromirror Array Lens with self-tilted micromirrors of the claim 1, wherein the self-tilted micromirror further comprises at least one support structure disposed on the substrate and connected to the stiction plate elastically.

8. The Micromirror Array Lens with self-tilted micromirrors of the claim 7, wherein the self-tilted micromirror further comprises at least one substrate spring structure connecting the stiction plate and the support structure.

9. The Micromirror Array Lens with self-tilted micromirrors of the claim 7, wherein the pivot structure is disposed on the micromirror plate and configured to contact the support structure when the stiction plate is attracted to the substrate.

10. The Micromirror Array Lens with self-tilted micromirrors of the claim 7, wherein the support structure is the pivot structure configured to contact the micromirror plate when the stiction plate is attracted to the substrate.

11. The Micromirror Array Lens with self-tilted micromirrors of the claim 1, wherein the pivot structure is disposed on the substrate and configured to contact the micromirror plate when the stiction plate is attracted to the substrate.

12. The Micromirror Array Lens with self-tilted micromirrors of the claim 1, wherein the pivot structure is disposed on the micromirror plate and configured to contact the substrate when the stiction plate is attracted to the substrate.

13. The Micromirror Array Lens with self-tilted micromirrors of the claim 1, wherein the adhesion force is caused by capillary action of a liquid used in a releasing process of micro-mechanical elements of the Micromirror Array Lens.

14. The Micromirror Array Lens with self-tilted micromirrors of the claim 1, wherein the adhesion force is adhesion surface force.

15. The Micromirror Array Lens with self-tilted micromirrors of the claim 1, wherein the adhesion force is der Waals force.

16. The Micromirror Array Lens with self-tilted micromirrors of the claim 1, wherein the adhesion force is caused by atomic bonding.

17. The Micromirror Array Lens with self-tilted micromirrors of the claim 1, wherein the adhesion force is electrostatic force by residual charge.

18. The Micromirror Array Lens with self-tilted micromirrors of the claim 1, wherein the stiction plate is attracted to the substrate in the releasing process of the micro-mechanical elements of the Micromirror Array Lens.

19. The Micromirror Array Lens with self-tilted micromirrors of the claim 1, wherein the stiction plate is attracted to the substrate in an initial operation of the Micromirror Array Lens.

20. The Micromirror Array Lens with self-tilted micromirrors of the claim 1, wherein the linear and angular position of the micromirror plate remains fixed by the adhesion force after the motion of the micromirror plate.

21. The Micromirror Array Lens with self-tilted micromirrors of the claim 1, wherein the self-tilted micromirror further comprises at least one dimple disposed between the micromirror plate and the substrate and configured to provide a space between the micromirror plate and the stiction plate.

22. The Micromirror Array Lens with self-tilted micromirrors of claim 1, wherein the designed optical surface profile is prepared to satisfy a convergence condition to form the lens.

23. The Micromirror Array Lens with self-tilted micromirrors of claim 1, wherein the designed optical surface profile is prepared to satisfy a phase matching condition to form the lens.

24. The Micromirror Array Lens with self-tilted micromirrors of claim 1, wherein the designed optical surface profile is prepared to correct an aberration of an optical system.

25. The Micromirror Array Lens with self-tilted micromirrors of claim 1, wherein the Micromirror Array Lens is a diffractive optical element.

* * * * *